(12) United States Patent
Xu et al.

(10) Patent No.: US 12,404,966 B2
(45) Date of Patent: Sep. 2, 2025

(54) DISPLAY MOUNTING SUPPORT

(71) Applicant: Xinadda (Hong Kong) Limited, Hong Kong (CN)

(72) Inventors: Hao Xu, Hong Kong (CN); Linghui Wu, Hong Kong (CN)

(73) Assignee: Xinadda (Hong Kong) Limited, Hong Kong (CN)

( * ) Notice: Subject to any disclaimer, the term of this patent is extended or adjusted under 35 U.S.C. 154(b) by 162 days.

(21) Appl. No.: 18/531,161

(22) Filed: Dec. 6, 2023

(65) Prior Publication Data

US 2025/0067384 A1 Feb. 27, 2025

(30) Foreign Application Priority Data

Aug. 26, 2023 (CN) .......................... 202322303828.1

(51) Int. Cl.
*F16M 11/04* (2006.01)
*F16M 11/10* (2006.01)

(52) U.S. Cl.
CPC ......... *F16M 11/048* (2013.01); *F16M 11/046* (2013.01); *F16M 11/10* (2013.01)

(58) Field of Classification Search
CPC ..... F16M 11/048; F16M 11/046; F16M 11/10
See application file for complete search history.

(56) References Cited

U.S. PATENT DOCUMENTS

| | | | | |
|---|---|---|---|---|
| 8,322,673 | B2* | 12/2012 | Sculler | F16M 13/02 |
| | | | | 248/917 |
| 8,456,808 | B2* | 6/2013 | Grey | F16M 11/10 |
| | | | | 361/679.01 |
| 10,159,345 | B2* | 12/2018 | Hung | F16M 11/2085 |
| 2019/0017653 | A1* | 1/2019 | Stifal | F16M 11/10 |
| 2020/0208774 | A1* | 7/2020 | Pei | H05K 5/0204 |
| 2023/0184375 | A1* | 6/2023 | Kolz | F16M 11/2014 |
| | | | | 312/7.2 |

\* cited by examiner

*Primary Examiner* — Terrell L McKinnon
*Assistant Examiner* — Ding Y Tan
(74) *Attorney, Agent, or Firm* — IP Spring

(57) ABSTRACT

The present disclosure provides a display mounting support including a wall plate and at least one hanging assembly. The wall plate defines a hanging hook groove. The hanging assembly is hung into the hanging hook groove. Each hanging assembly includes a hanging hook member, a retractable mechanism and a display hanging member. The hanging hook member includes a hanging rod, a connecting rod and a hanging hook. The connecting rod is connected between the hanging rod and the hanging hook. The hanging hook includes a cantilever portion and a first concave structure. The retractable mechanism is connected between the hanging rod and the display hanging member. The display hanging member is configured to fix to a back of a display. The hanging hook of the hanging assembly is inserted into the hanging hook groove for hanging the display on the wall plate.

20 Claims, 19 Drawing Sheets

DISPLAY MOUNTING SUPPORT

CROSS-REFERENCE TO RELATED APPLICATIONS

This application claims priority under 35 U.S.C. § 119 (a) to Chinese Patent Application No. 202322303828.1, filed Aug. 26, 2023, the entire disclosure of which is incorporated herein by reference.

TECHNICAL FIELD

The present disclosure relates to technical fields of display mounting, and in particular relates to a display mounting support.

BACKGROUND

Electronic devices such as flat panel televisions, displays and so on have been widely used due to their advantages such as high definition, large screen, light weight, and so on. In the prior art, flat panel televisions or displays are generally mounted on a wall using a wall mount, thereby saving space in a house. In order to adapt to different use scenarios, the existing display mounting support can also realize an adjustment for left-right rotation angle, specifically: the hanging hook of the display mounting support is widened in a front to back direction, so as to adjust a rotation angle of the display in a left-right direction. However, this method results in a large gap between the hanging hook and the wall plate of the display mounting support, which is easy to wobble, and the use experience is reduced in quality.

SUMMARY

For this purpose, the present disclosure proposes a display mounting support to solve at least one of the above mentioned technical problems.

In order to solve the above mentioned technical problems, the technical solutions of the present disclosure are as follows.

In a first aspect, the present disclosure provides a display mounting support including a wall plate and at least one hanging assembly. The wall plate includes a wall frame and a first guiding bar. The wall frame is configured to be mounted on a wall surface. The wall frame and the first guiding bar are connected to form a hanging hook groove. The hanging hook groove extends along a left-right direction of the display mounting support. The hanging assembly is hung into the hanging hook groove of the wall plate. Each hanging assembly includes a hanging hook member, a retractable mechanism and a display hanging member. The hanging hook member includes a hanging rod, a connecting rod and a hanging hook. The connecting rod is connected between one end of the hanging rod and one side of the hanging hook. The hanging hook includes a cantilever portion and a first concave structure. The cantilever portion is connected to one end of the connecting rod away from the hanging rod and towards the wall plate. The first concave structure includes a first plate portion and a second plate portion. The first plate portion and the second plate portion are disposed side by side on one side of the cantilever portion facing the wall plate and extending towards the hanging rod. Adjacent edges of the first plate portion and the second plate portion intersect with each other. The first concave structure is recessed when viewed from the wall plate. The retractable mechanism is connected between the hanging rod and the display hanging member. The display hanging member is configured to fix to a predetermined position on a back of a display. The hanging hook is inserted into the hanging hook groove for hanging the display on the wall plate.

In combination with the first aspect, in some embodiments of the present disclosure, the connecting rod is hollow and open on a side facing the wall plate to form a receiving groove. The hanging hook member further includes a first supporting member. The first supporting member is received in the receiving groove. The first supporting member includes a first convex structure on a side facing the hanging hook. The first convex structure includes a third plate portion and a fourth plate portion. The third plate portion is adjacent to the first plate portion. The fourth plate portion is adjacent the second plate portion. Adjacent edges of the third plate portion and the fourth plate portion intersect with each other. The first convex structure is protruded when viewed from the wall plate. A minimum distance between the first convex structure and the first concave structure is greater than or equal to a thickness of the first guiding bar.

In combination with the first aspect, in some embodiments of the present disclosure, the third plate portion and the second plate portion are parallel, and a distance between planes where each of the third plate portion and the second plate portion is located is greater than or equal to a thickness of the first guiding bar. The first plate portion and the fourth plate portion are parallel, and a distance between planes where each of the first plate portion and the fourth plate portion is located is greater than or equal to the thickness of the first guiding bar.

In combination with the first aspect, in some embodiments of the present disclosure, the first concave structure is a V-shaped structure, and the first convex structure is correspondingly also a V-shaped structure.

In combination with the first aspect, in some embodiments of the present disclosure, the first supporting member further includes a protruding portion. The protruding portion including a fifth plate portion and a sixth plate portion. Adjacent edges of the fifth plate portion and the sixth plate portion intersect with each other. The fifth plate portion is adjacent to and parallel to the first plate portion. The sixth plate portion is adjacent to and parallel to the second plate portion. When the first supporting member is received in the receiving groove, the fifth plate portion resists against inside of the first plate portion, and the sixth plate portion resists against inside of the second plate portion.

In combination with the first aspect, in some embodiments of the present disclosure, the wall plate further includes a second guiding bar, the wall frame and the second guiding bar are connected to form a locking hook groove. The locking hook groove extends along a left-right direction of the display mounting support. Opening of the locking hook groove and opening of the hanging hook groove are set back to back. The hanging assembly further includes a pull cord assembly. The pull cord assembly is connected to the other end of the hanging rod. The pull cord assembly includes a locking hook. The locking hook includes two cantilevers and a second concave structure. The second concave structure is connected between the two cantilevers. The second concave structure includes a seventh plate portion and an eighth plate portion. Adjacent edges of the seventh plate portion and the eighth plate portion intersect with each other. The second concave structure is recessed when viewed from the wall plate. The locking hook of the hanging assembly is inserted into the locking hook groove for locking the hanging assembly on the wall plate.

In combination with the first aspect, in some embodiments of the present disclosure, the hanging rod is hollow inside, and, the other end of the hanging rod on the side facing the wall plate defines an opening. The pull cord assembly further includes a locking member, a shaft, a tension spring and a pull rope. The locking member is received inside the other end of the hanging rod and is partially exposed from the opening. The locking member includes a bottom wall, a first sidewall, a second sidewall and a locking hook. The first sidewall and the second sidewall are located opposite to each other. The locking hook is connected to sides of the first sidewall and the second sidewall adjacent the wall plate. The bottom wall is connected to bottom ends of the first sidewall, the second sidewall and the locking hook simultaneously. At least one of the first sidewall and the second sidewall defines a first limiting groove extending along a height direction of the display mounting support. The hanging rod defines a shaft hole correspondingly. The shaft passes through the first limiting groove and is fixed in the shaft hole. The tension spring is located in the locking member. One end of the tension spring is connected to the shaft, and the other end of the tension spring is fixed to the bottom wall of the locking member. The pull rope is located outside of the locking member, and is fixed to the bottom wall of the locking member.

In combination with the first aspect, in some embodiments of the present disclosure, the pull cord assembly further includes a second supporting member. The second supporting member is located within the locking member. The second supporting member includes a second convex structure on a side of the second supporting member facing the locking hook. The second convex structure includes a ninth plate portion and a tenth plate portion. The ninth plate portion is adjacent to the seventh plate portion. The tenth plate portion is adjacent to the eighth plate portion. Adjacent edges of the ninth plate portion and the tenth plate portion intersect with each other. The second convex structure is protruded when being viewed from the wall plate. A minimum distance between the second convex structure and the second concave structure is greater than or equal to a thickness of the second guiding bar.

In combination with the first aspect, in some embodiments of the present disclosure, the seventh plate portion and the tenth plate portion are parallel: a distance between planes where each of the seventh plate portion and the tenth plate portion is located is greater than or equal to a thickness of the second guiding bar: the eighth plate portion and the ninth plate portion are parallel, and a distance between planes where each of the eighth plate portion and the ninth plate portion is located is greater than or equal to the thickness of the second guiding bar.

In combination with the first aspect, in some embodiments of the present disclosure, the second concave structure is a V-shaped structure, and the second convex structure is correspondingly also a V-shaped structure.

In combination with the first aspect, in some embodiments of the present disclosure, the display mounting support further includes a height adjusting mechanism. The height adjusting mechanism includes a first height adjusting member, a second height adjusting member, and a height adjusting bolt. The first height adjusting member is located within the receiving groove of the connecting rod and passes through the first supporting member. The second height adjusting member is located with the hanging rod. The first height adjusting member is connected with the second height adjusting member. The first height adjusting member defines a first bolt hole at a top of the first height adjusting member. A top plate of the connecting rod defines a second bolt hole. The height adjusting bolt passes through the first bolt hole and the second bolt hole so as to connect the first height adjusting member with the top plate of the connecting rod. The height adjusting bolt adjusts a relative position of the first height adjusting member and the second height adjusting member within the hanging hook member. The second height adjusting member is connected to the retractable mechanism.

In combination with the first aspect, in some embodiments of the present disclosure, the retractable mechanism includes a first gear arm, a second gear arm, a third gear arm and a fourth gear arm. The first gear arm, the second gear arm, the third gear arm and the fourth gear arm are connected in a quadrilateral structure. Ends of the first gear arm and the second gear arm are connected by gear meshing and simultaneously pivotally connected to the hanging member. Ends of the third gear arm and the fourth gear arm are connected by gear meshing and simultaneously pivotally connected to the display hanging member. The first gear arm is pivotally connected to the third gear arm, and the second gear arm is pivotally connected to the fourth gear arm.

In combination with the first aspect, in some embodiments of the present disclosure, the display mounting support further includes a tilt adjusting mechanism. The tilt adjusting mechanism includes a mounting member and an adjusting handle. The mounting member is secured to the hanging hook member. The mounting member includes a screw located on a sidewall thereof. The display hanging member further includes a lug portion located on a sidewall thereof. The lug portion defines an arcuate groove. The screw passes through the arcuate groove. The adjusting handle is threadedly connected with the screw. When the screw is located at different positions of the arcuate groove, the display hanging member has different front-to-rear tilting angles relative to the mounting member.

A second aspect of the present disclosure provides a display mounting support including a wall plate and at least one hanging assembly. The wall plate including a wall frame and a first guiding bar. The wall frame is configured for fixing to a wall surface. The wall frame and the first guiding bar are connected to form a hanging hook groove. The hanging hook groove extends along a left-right direction of the display mounting support. The hanging assembly is hung into different positions of the hanging hook groove of the wall plate. Each hanging assembly includes a hanging hook member, a retractable mechanism and a display hanging member. The hanging hook member including a hanging rod, a connecting rod and a hanging hook. The connecting rod is connected between one end of the hanging rod and one side of the hanging hook. The connecting rod is hollow and open on a side facing the wall plate to form a receiving groove. The first supporting member is received in the receiving groove. The first supporting member includes a first convex structure on a side facing the hanging hook. The first convex structure includes a first plate portion and a second plate portion. Adjacent edges of the first plate portion and the second plate portion intersect with each other. The first convex structure is protruded when viewed from the wall plate. The retractable mechanism is connected between the hanging rod and the display hanging member. The display hanging member is configured to fix to a predetermined position on a back of a display. The hanging hook is inserted into the hanging hook groove for hanging the display on the wall plate.

In combination with the second aspect, in some embodiments of the present disclosure, the hanging hook includes a cantilever portion and a first concave structure. The cantilever portion is connected to one end of the connecting rod away from the hanging rod and towards the wall plate. The first concave structure includes a third plate portion and a fourth plate portion. The third plate portion and the fourth plate portion are disposed side by side on the side of the cantilever portion facing the wall plate and extending towards the hanging rod. Adjacent edges of the third plate portion and the fourth plate portion intersect with each other. The first concave structure is recessed when viewed from the wall plate. A minimum distance between the first convex structure and the first concave structure is greater than or equal to a thickness of the first guiding bar.

In combination with the second aspect, in some embodiments of the present disclosure, the first concave structure is a V-shaped structure, and the first convex structure is correspondingly also a V-shaped structure.

In combination with the second aspect, in some embodiments of the present disclosure, the first supporting member further includes a protruding portion. The protruding portion includes a fifth plate portion and a sixth plate portion. Adjacent edges of the fifth plate portion and the sixth plate portion intersects with each other. The fifth plate portion is adjacent to and parallel to the first plate portion. The sixth plate portion is adjacent to and parallel to the second plate portion. When the first supporting member is received in the receiving groove, the fifth plate portion resists against inside of the first plate portion, and the sixth plate portion resists against inside of the second plate portion.

In combination with the second aspect, in some embodiments of the present disclosure, the wall plate further includes a second guiding bar. The wall frame and the second guiding bar are connected to form a locking hook groove. The locking hook groove extends along a left-right direction of the display mounting support. Opening of the locking hook groove and opening of the hanging hook groove are set back to back. The hanging assembly further includes a pull cord assembly. The pull cord assembly is connected to the other end of the hanging rod. The pull cord assembly includes a locking hook. The locking hook is inserted into the locking hook groove for locking the hanging assembly on the wall plate. The pull cord assembly further includes a second supporting member. The second supporting member is connected to one end of the hanging rod away from the hanging hook. The second supporting member includes a second convex structure on a side of the second supporting member facing the locking hook. The second convex structure includes a seventh plate portion and an eighth plate portion. Adjacent edges of the seventh plate portion and the eighth plate portion intersect with each other. The second convex structure is protruded when being viewed from the wall plate.

In combination with the second aspect, in some embodiments of the present disclosure, the locking hook includes two cantilever arms and a second concave structure. The second concave structure is connected between the two cantilever arms. The second concave structure includes a ninth plate portion and a tenth plate portion. The ninth plate portion is adjacent to the seventh plate portion. The tenth plate portion is adjacent to the eighth plate portion. Adjacent edges of the ninth plate portion and the tenth plate portion intersect with each other. The second concave structure is recessed when being viewed from the wall plate.

In combination with the second aspect, in some embodiments of the present disclosure, the second supporting member defines an inserting groove. The pull cord assembly includes a locking member. The locking member include an inserting portion and the locking hook. The locking hook is connected to one side of the inserting portion. The inserting portion is inserted into the inserting groove. The locking hook is located outside of the inserting groove, and spaced apart from the second convex structure of the second supporting member so as to form a snapping space for snapping into the locking hook groove.

In combination with the second aspect, in some embodiments of the present disclosure, the second concave structure is V-shaped, and the second convex structure is correspondingly V-shaped.

Compared with the prior art, the beneficial effect of the present disclosure is as follows:

Compared with the prior art, the present disclosure adopts a hanging hook with a first concave structure or a first supporting member with a first concave structure, which can reduce a movement gap of the hanging hook relative to the first guiding bar without affecting the adjustment of the left-right rotation angles, so that the display mounting support has a smaller movement gap between the hanging hook and the first guiding bar at any rotation angle within the adjustable range of the left-right rotation angles, avoiding problems such as wobbling or empty travel due to the large movement gap between the hanging hook and the first guiding bar.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, and those of ordinary skilled in the art may also obtain other drawings based on these drawings.

DETAILED DESCRIPTION OF ILLUSTRATED EMBODIMENTS

Embodiments of the present disclosure are described in detail below. Examples of the embodiments are shown in the accompanying drawings. The same or similar labeling throughout denotes the same or similar elements or elements having the same or similar functions. The embodiments described below by reference to the accompanying drawings are exemplary and are intended to be configured to explain the present disclosure and are not to be construed as limiting the present disclosure.

Furthermore, the terms "first" and "second" are used for descriptive purposes only and are not to be understood as indicating or implying relative importance or implicitly specifying the number of technical features indicated. Therefore, a feature defined with "first" or "second" may include one or more such features, either explicitly or implicitly. In the description of the present disclosure, "more than one" means two or more, unless otherwise expressly and specifically limited.

In the present disclosure, unless otherwise expressly specified and limited, the terms "connected", "fixed", and so on are to be understood broadly, e.g., they may be fixedly connected, removably connected, or integrally connected: they may be mechanically connected or electrically connected: they may be directly connected or indirectly connected through an intermediate medium: they may be interconnected within two elements or an interactive relationship between two elements. For those of ordinary skill in the art, the specific meaning of the above terms in the present disclosure may be understood on a case-by-case basis.

Figure 1:
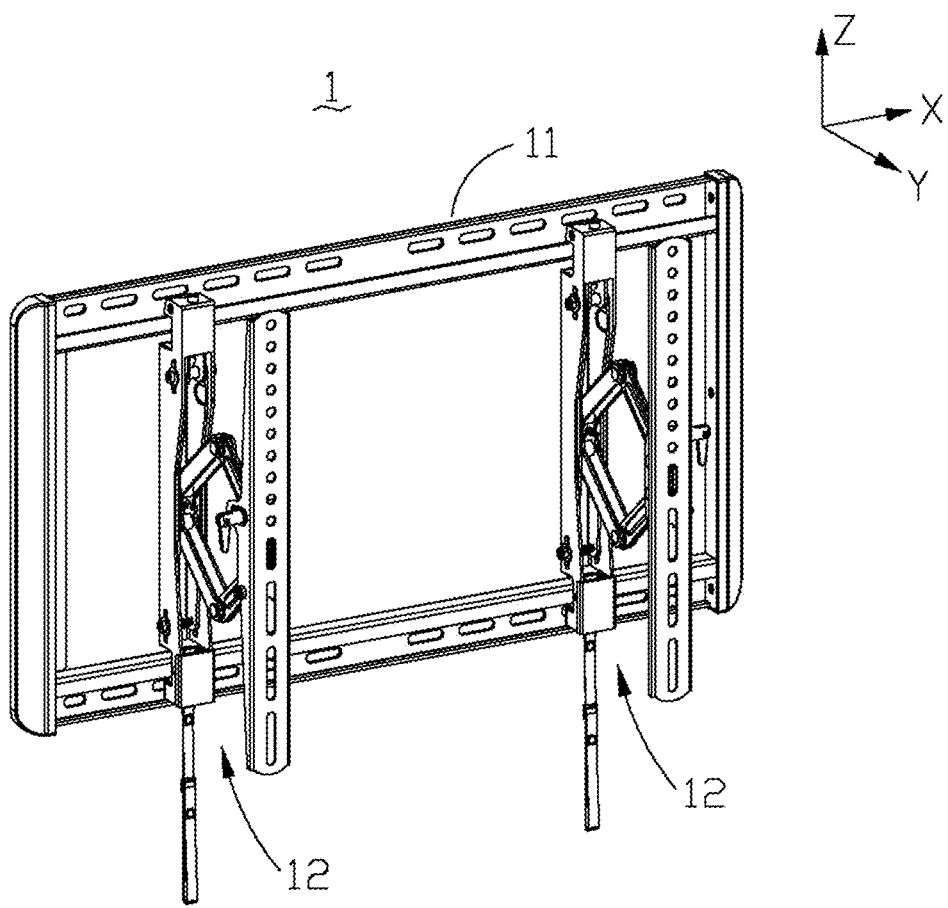
FIG. 1 illustrates a three-dimensional structural schematic view of a display mounting support 1 in accordance with an embodiment of the present disclosure.

Referring to FIG. 1, FIG. 1 illustrates a three-dimensional structural schematic view of a display mounting support 1 in accordance with an embodiment of the present disclosure.

For convenience of description, a front-back direction of the display mounting support 1 shown in FIG. 1 is defined as a Y-axis direction, i.e., a thickness direction, a left-right direction of the display mounting support 1 shown in FIG. 1 is defined as an X-axis direction, and a height direction of the display mounting support 1 shown in FIG. 1 is defined as a Z-axis direction. The orientation terms such as "top", "bottom", "left" and "right" mentioned in the description of the display mounting support 1 in embodiments of the present disclosure are based on the orientation shown in FIG. 1 of the accompanying drawings of the specification, with a positive direction of Z-axis as the "top", a negative direction of Z-axis as the "bottom", a negative direction of X-axis as the "left" and a positive direction of the X-axis as "right", which does not constitute a limitation of the display mounting support 1 in an actual application scenario.

Figure 2:
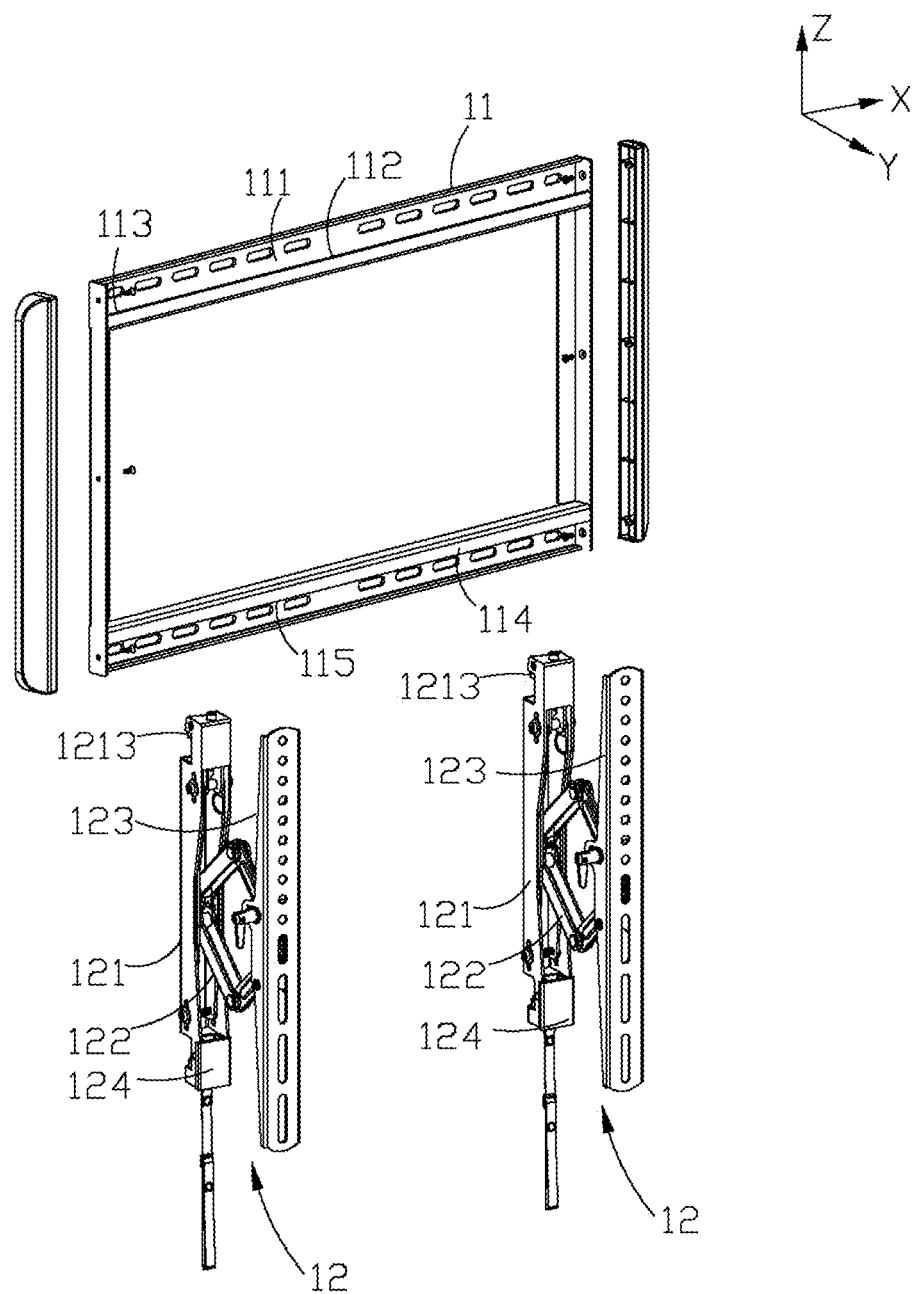
FIG. 2 illustrates an exploded view of the display mounting support in an embodiment of the present disclosure.
Figure 3:
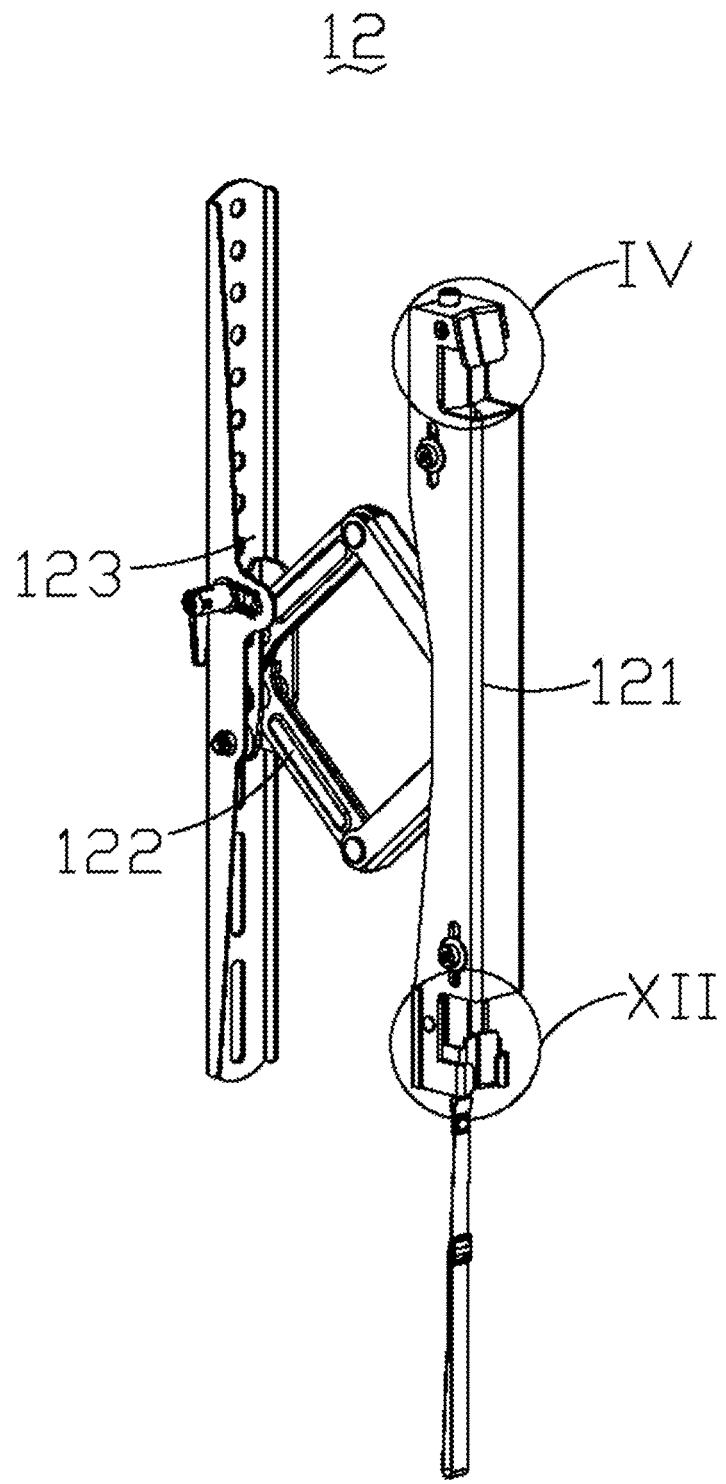
FIG. 3 illustrates a three-dimensional structural schematic view of the hanging assembly from another view in accordance with an embodiment of the present disclosure.
Figure 4:
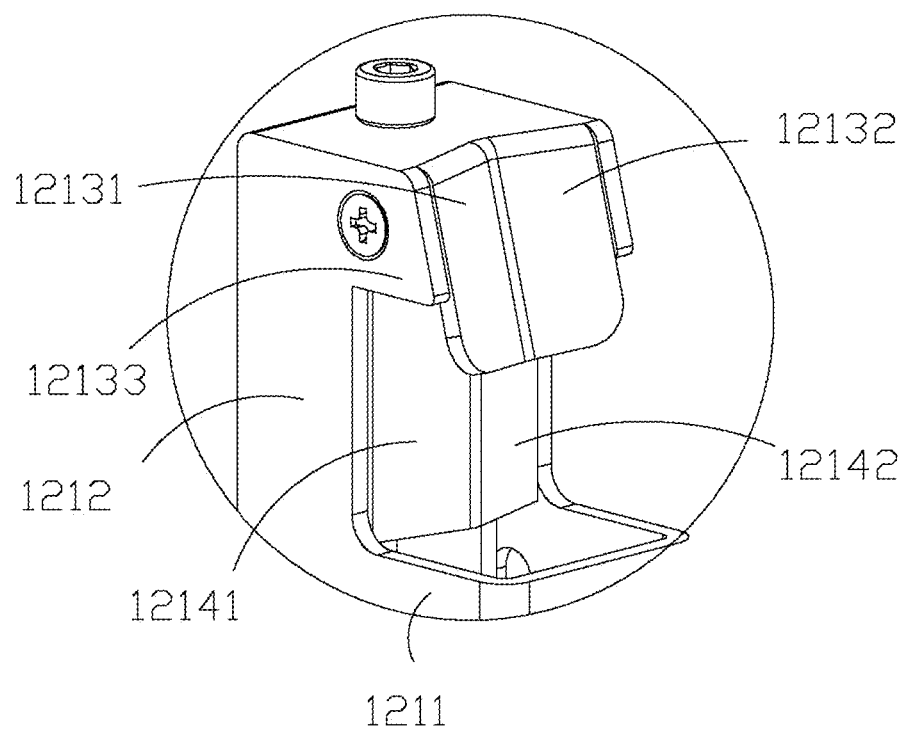
FIG. 4 illustrates a partial enlarged view of FIG. 3 at IV.
Figure 5:
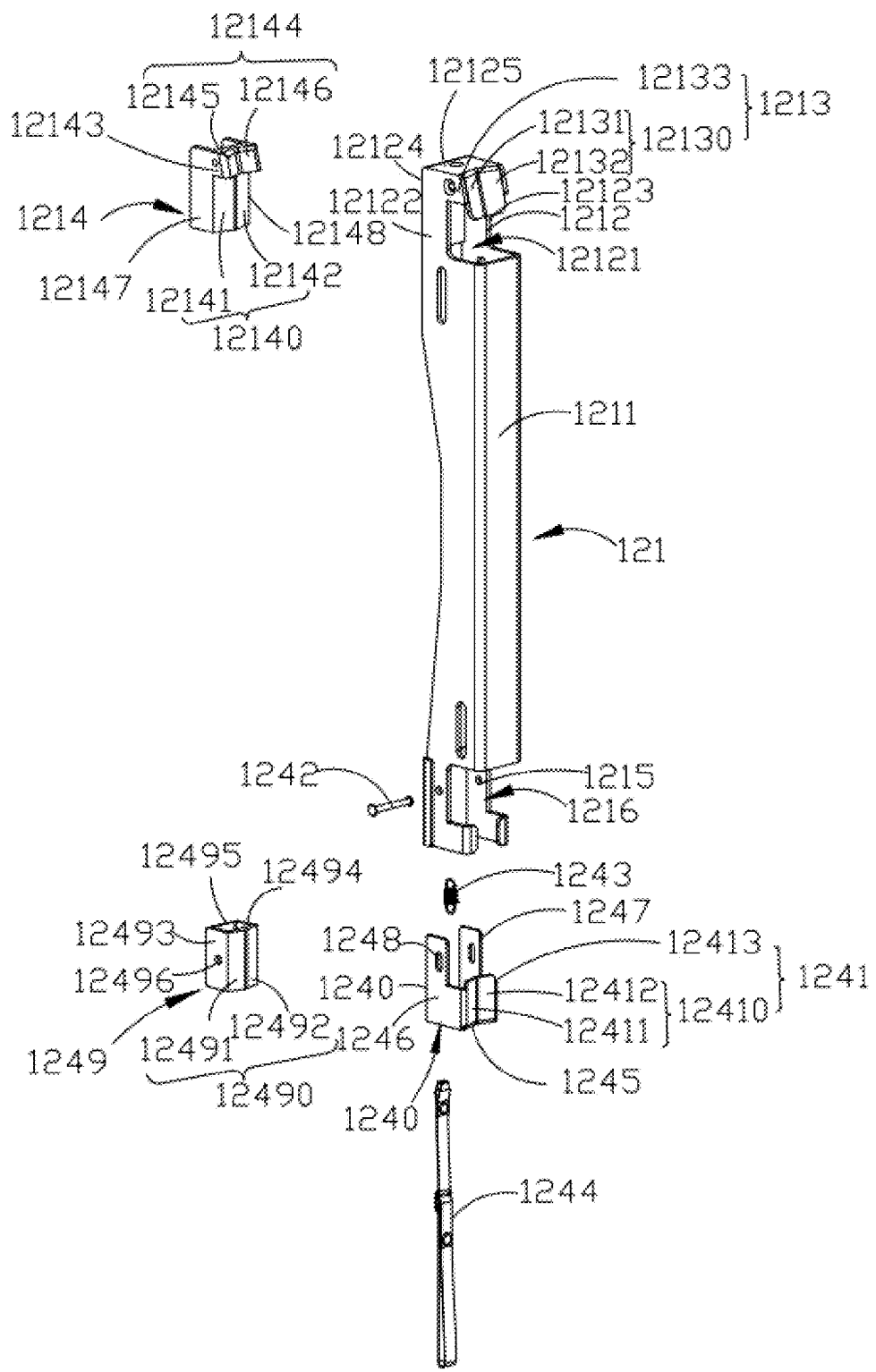
FIG. 5 illustrates an exploded view of a hanging hook member of FIG. 3.

As shown in FIG. 1, the display mounting support 1 includes a wall plate 11 and two hanging assemblies 12. The wall plate 11 is configured for being fixed on a wall. One side of each hanging assembly 12 is configured for hanging on the wall plate 11, and the other side of each hanging assembly 12 is configured for fixing on a display screen (not shown), so as to hang the display screen on the wall plate 11. Referring to FIG. 2, FIG. 2 illustrates an exploded view of the display mounting support 1 in an embodiment of the present disclosure. The wall plate 11 includes a wall frame 111 and a first guiding bar 112. The wall frame 111 and the first guiding bar 112 are connected to form a hanging hook groove 113. The hanging hook groove 113 extends along a left-right direction of the display mounting support 1. Each hanging assembly 12 includes a hanging hook member 121, a retractable mechanism 122, and a display hanging member 123. Referring to FIGS. 3 and 4 together, FIG. 3 illustrates a three-dimensional structural schematic view of the hanging assembly from another view in accordance with an embodiment of the present disclosure: FIG. 4 illustrates a partial enlarged view of FIG. 3 at IV; and FIG. 5 illustrates an exploded view of a hanging hook member 121 of FIG. 3. As shown in FIG. 5, the hanging hook member 121 includes a hanging rod 1211, a connecting rod 1212, and a hanging hook 1213. The connecting rod 1212 is connected between one end of the hanging rod 1211 and one side of the hanging hook 1213. The hanging hook 1213 includes a cantilever portion 12133 and a first concave structure 12130. The cantilever portion 12133 is connected to one end of the connecting rod 1212 away from the hanging rod 1211 and towards the wall plate 11. The first concave structure 12130 includes a first plate portion 12131 and a second plate portion 12132. The first plate portion 12131 and the second plate portion 12132 are disposed side by side on the side of the cantilever portion 12133 facing the wall plate 11 and extending towards the hanging rod 1211. Adjacent edges of the first plate portion 12131 and the second plate portion 12132 intersect with each other. The first concave structure 12130 is recessed when viewed from the wall plate 11. Referring to FIG. 3, the retractable mechanism 122 is connected between the hanging rod 1211 and the display hanging member 123. Referring again to FIG. 2, the display hanging member 123 is configured to fix to a predetermined position on a back of a display. The hanging hook 1213 of each of the two hanging assemblies 12 is inserted into the hanging hook groove 113 for hanging each of the two hanging assemblies 12 on the wall plate 11. It can be understood that in other embodiments, the hanging assembly 12 may be one or more, without limitation herein.

Figure 6:
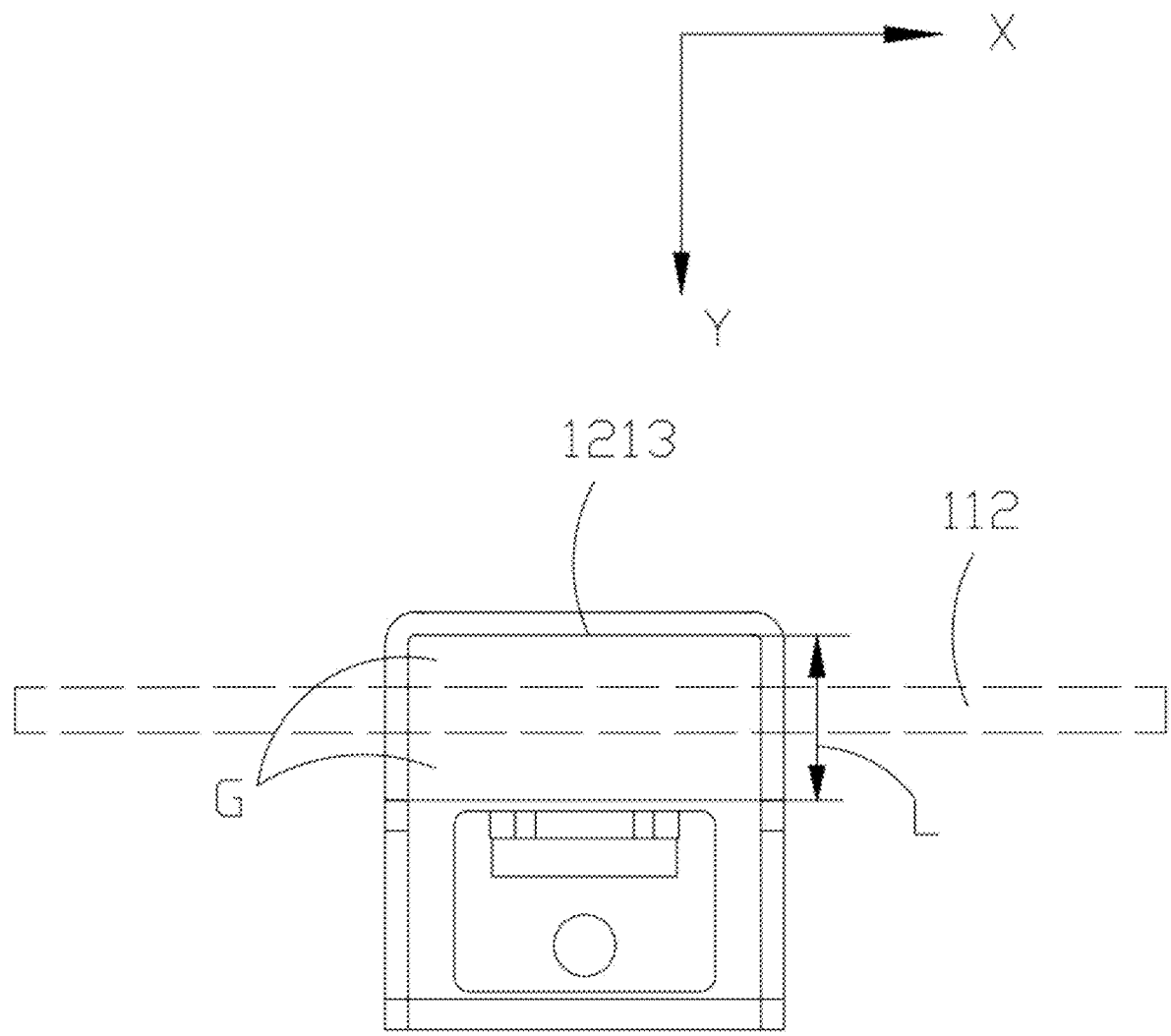
FIG. 6 illustrates a schematic view of a positional relationship between a hanging hook and a first guiding bar in the prior art.
Figure 7:
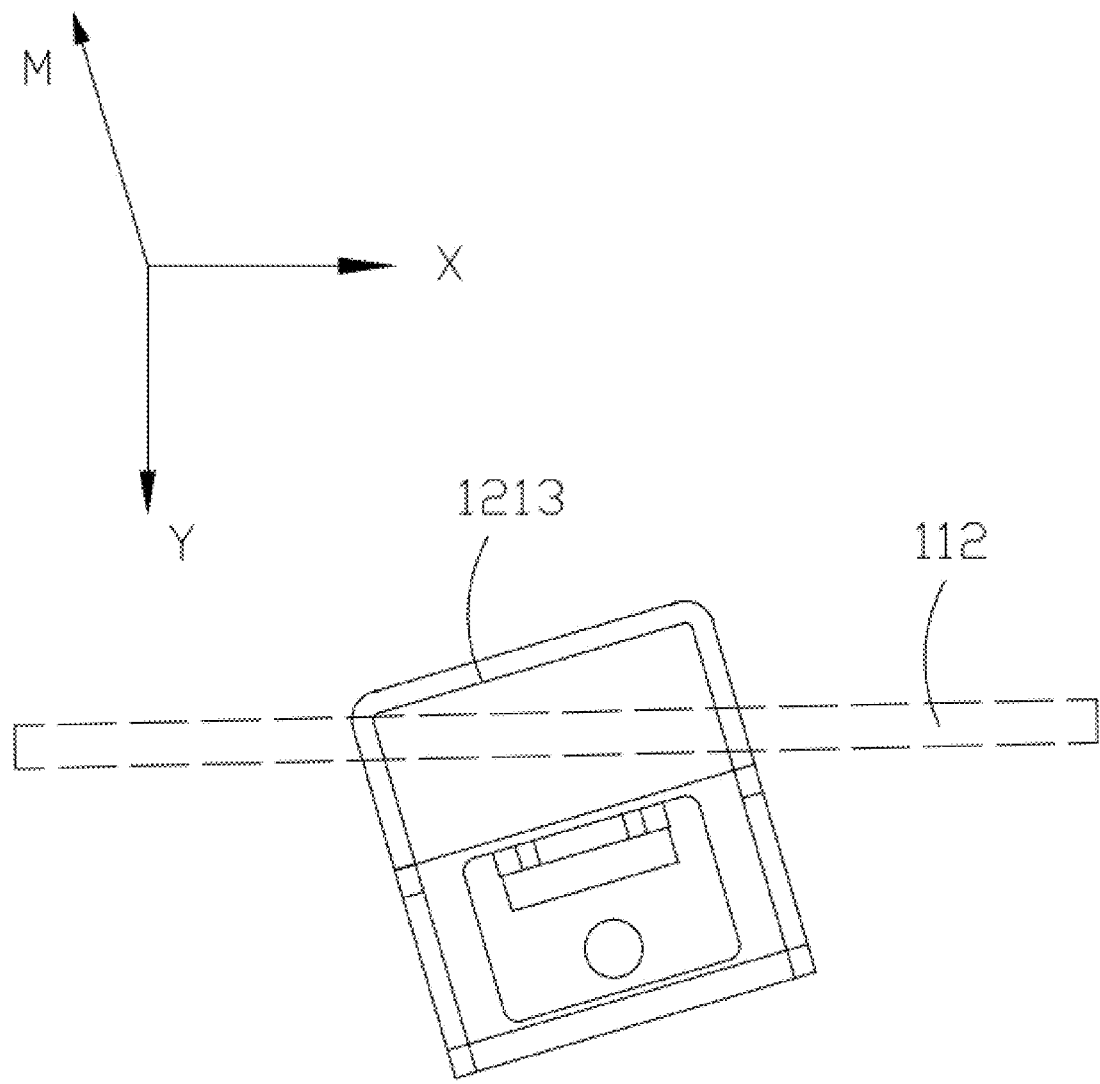
FIG. 7 illustrates a schematic view of a positional relationship between a hanging hook and a first guiding bar in the prior art.
Figure 8:
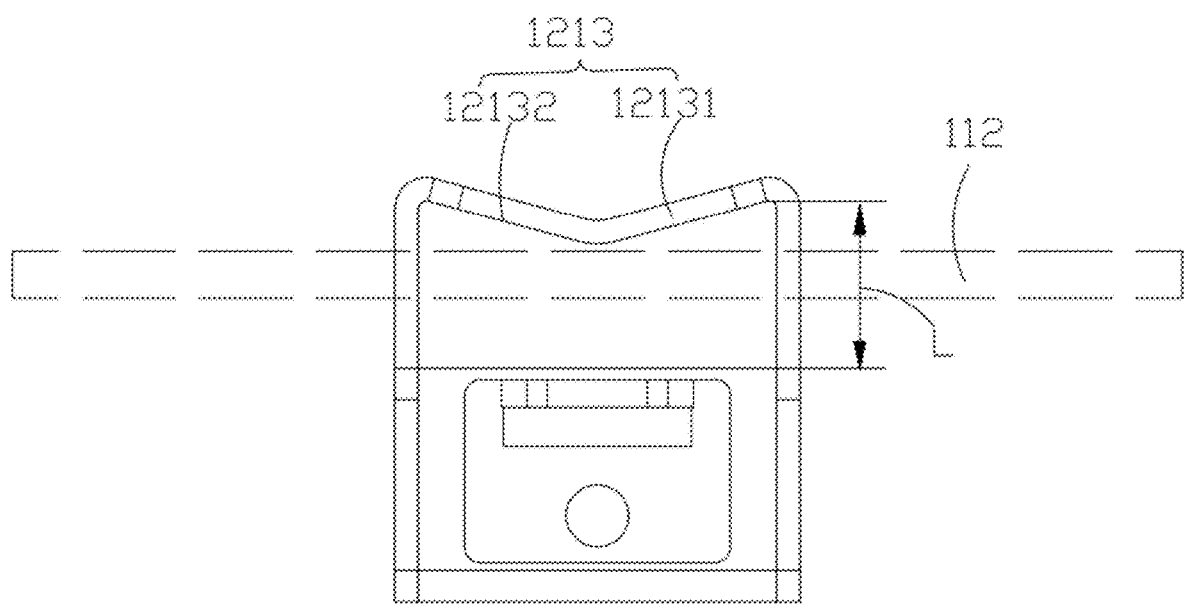
FIG. 8 illustrates a schematic view of a positional relationship between a hanging hook and a first guiding bar in accordance with an embodiment of the present disclosure.

Referring to FIG. 6, in the prior art, in order to enable the display mounting support 1 to achieve left and right rotation, the hanging hook 1213 has a larger dimension L in the Y-axis direction, and in FIG. 6, the span of the hanging hook 1213 in the Y-axis direction is in an area labeled as dimension L in the figure, and furthermore, the hanging hook 1213 is in a shape of an inverted L when viewed from the X-axis direction, and the hanging hook 1213 is in a shape of a straight face when viewed from a negative direction of the Y-axis. When the hanging hook 1213 is in a parallel state relative to the first guiding bar 112, there exists a movement gap G between the hanging hook 1213 and the first guiding bar 112, and the movement gap G is large, which will lead to an empty travel when adjusting a left-right rotation angle or a forward-backward movement distance, affecting the experience. Similarly, when the hanging hook 1213 rotates counterclockwise or clockwise relative to the first guiding bar 112 but does not reach a limit position, there is a gap G between the hanging hook 1213 and the first guiding bar 112, which will lead to an empty travel when adjusting a left-right rotation angle or a forward-backward movement distance, affecting the experience. Referring to FIG. 7, in the prior art, when the hanging hook 1213 is rotated counterclockwise to a limit position, one side of the hanging hook 1213 can be held against the first guiding bar 112, and similarly, when the hanging hook 1213 is rotated clockwise to a limit position, the other side of the hanging hook 1213 can be held against the first guiding bar 112. Therefore, a problem of the large movement gap between the hanging hook 1213 and the first guiding bar 112 in the prior art does not exist only when the hanging hook 1213 is rotated counterclockwise to the limit position or clockwise to the limit position. However, when the hanging hook 1213 is rotated relative to the first guiding bar 112 but not to the limit position, there exists the movement gap G between the hanging hook 1213 and the first guiding bar 112, which can lead to the empty travel when adjusting the left-right rotation angles or the forward-backward movement distance, affecting the experience. In the present disclosure, please referring to FIG. 8, by adopting the hanging hook 1213 having the first concave structure 12130, the size of the hanging hook 1213 in the Y-axis direction, i.e., the thickness direction, can be increased, and thus the movement gap of the hanging hook 1213 relative to the first guiding bar 112 can be reduced without affecting the adjustment of the left-right rotation angles, so that the display mounting support 1 has a smaller movement gap between the hanging hook 1213 and the first guiding bar 112 at any rotation angle within an adjustable range of the left-right rotation angle, and avoids problems such as wobbling or empty travel between the hanging hook 1213 and the first guiding bar 112 due to excessive movement gap.

In some embodiments, referring again to FIG. 5, the connecting rod 1212 is hollow and open on a side facing the wall plate 11 to form a receiving groove 12121. The hanging hook member 121 also includes a first supporting member 1214. The first supporting member 1214 is received in the receiving groove 12121. The first supporting member 1214 includes a first convex structure 12140 on a side facing the hanging hook 1213. The first convex structure 12140 includes a third plate portion 12141 and a fourth plate portion 12142. The third plate portion 12141 is adjacent to the first plate portion 12131, and the fourth plate portion 12142 is adjacent to the second plate portion 12132. Adjacent edges of the third plate portion 12141 and the fourth plate portion 12142 intersect with each other. The first convex structure 12140) and the first concave structure 12130 are disposed back to back. Referring to FIG. 9B, a minimum distance between the first convex structure 12140) and the first concave structure 12130 is greater than or equal to a thickness of the first guiding bar 112. In some embodiments, the difference between the minimum distance between the first convex structure 12140 and the first concave structure 12130 and the thickness of the first guiding bar 112 is within 0.0 to 1.5 mm. It can be understood that in other embodiments, a range of the difference may be adjusted according to practical needs.

Therefore, in the present disclosure, by adding the first convex structure 12140, the first convex structure 12140 and the first concave structure 12130 are located back to back, which can further narrow the movement gap between the hanging hook 1213 and the first guiding bar 112, reduce wobbling of the hanging hook 1213 relative to the first guiding bar 112 without affecting the adjustment of the left-right rotation angles, and enhance the user experience.

In some embodiments, the first supporting member 1214 is a plastic member. It can be understood that, in other embodiments, the first supporting member 1214 may also be a metal member, etc., and is not limited herein.

In some embodiments, referring again to FIG. 4, the first concave structure 12130 and the first convex structure 12140 are both V-shaped. Correspondingly, the first plate portion 12131, the second plate portion 12132, the third plate portion 12141 and the fourth plate portion 12142 may be in a form of a planar plate. The third plate portion 12141 and the first plate portion 12131 together form a V-shaped angle between them. The second plate portion 12132 and the fourth plate portion 12142 together form a V-shaped angle between them. And, referring again to FIG. 9B, the third plate portion 12141 and the second plate portion 12132 are parallel, and a distance between the planes where each of the third plate portion 12141 and the second plate portion 12132 is located is greater than or equal to the thickness of the first guiding bar 112. In this embodiment, the distance between the planes where each of the third plate portion 12141 and the second plate portion 12132 is located is slightly greater than the thickness of the first guiding bar 112, and the difference between the distance between the planes where each of the third plate portion 12141 and the second plate portion 12132 is located and the thickness of the first guiding bar is 0.0 mm-1.5 mm, which is able to ensure that the hanging hook 1213 can be smoothly hung in the hanging hook groove 113, i.e., the first guiding bar 112 can smoothly enter between the third plate portion 12141 and the second plate portion 12132, while avoiding wobbling caused by excessive gaps between the third plate portion 12141 and the second plate portion 12132. It can be understood that, in other embodiments, the range of the difference may be adjusted according to actual needs. The first plate portion 12131 and the fourth plate portion 12142 are parallel, and a distance between the planes where each of the first plate portion 12131 and the fourth plate portion 12142 is located is greater than or equal to the thickness of the first guiding bar 112. In this embodiment, the distance between the planes where each of the first plate portion 12131 and the fourth plate portion 12142 is located is slightly greater than the thickness of the first guiding bar 112, and the difference between the distance between the planes where each of the first plate portion 12131 and the fourth plate portion 12142 is located and the thickness of the first guiding bar 112 is 0.0 mm-1.5 mm, which is able to ensure that the hanging hook 1213 can be smoothly hung in the hanging hook groove 113, i.e., the first guiding bar 112 can smoothly enter between the first plate portion 12131 and the fourth plate portion 12142, while avoiding wobbling caused by excessive gaps between the first plate portion 12131 and the fourth plate portion

12142. It can be understood that in other embodiments, the range of the difference may be adjusted according to actual needs.

Therefore, through the mutual cooperation of the third plate portion 12141 and the second plate portion 12132, and the mutual cooperation of the first plate portion 12131 and the fourth plate portion 12142, it is possible to further narrow the movement gap of the hanging hook 1213 relative to the first guiding bar 112, which makes the hanging hook 1213 more reliable and stable when it is rotated to the limit position relative to the first guiding bar 112.

It can be understood that, in other embodiments, the first concave structure 12130) and the first convex structure 12140 may be in a shape of a C-shape or a polygonal shape, etc., respectively, Correspondingly, the first plate portion 12131, the second plate portion 12132, the third plate portion 12141 and the fourth plate portion 12142 may be in a shape of a curved plate or a polygonal plate and will not be limited herein.

Figure 9A:
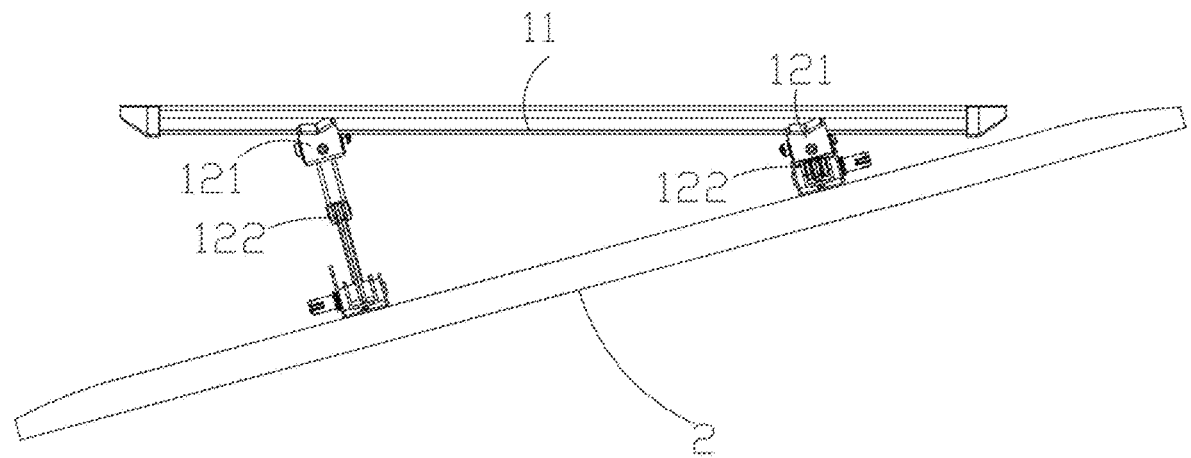
FIG. 9A illustrates a schematic view of a display mounting support being adjusted to the right in accordance with an embodiment of the present disclosure.
Figure 9B:
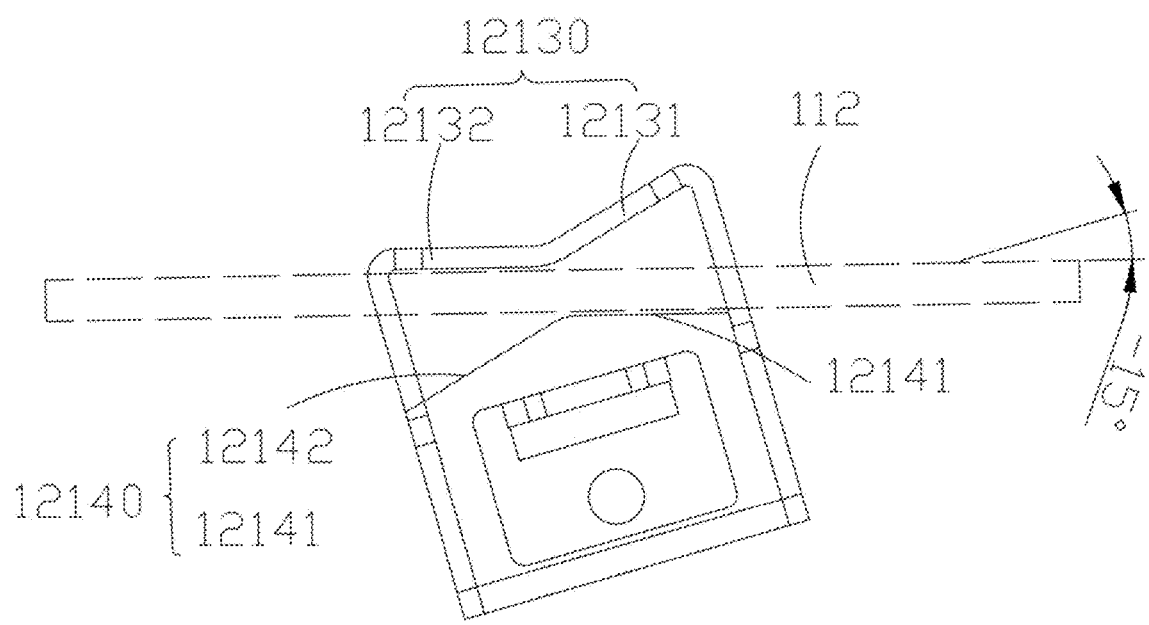
FIG. 9B illustrates a schematic view of a positional relationship between the hanging hook and the first guiding bar in a first limit position in accordance with an embodiment of the present disclosure.

Referring to FIGS. 9A and 9B, the retractable mechanisms 122 of the two hanging assemblies 12 may have different retractable lengths. When the display 2 is held by hand to be rotated to the right, the hanging hook 1213 is rotated counterclockwise relative to the first guiding bar 112. When the hanging hook 1213 is rotated counterclockwise relative to the first guiding bar 112 to a first limit position, the second plate portion 12132 and the third plate portion 12141 rest against the opposite sides of the first guiding bar 112, respectively. In this embodiment, the maximum angle at which the hanging hook 1213 rotates counterclockwise relative to the first guiding bar 112 is −15 degrees. It can be understood that, in other embodiments, the maximum angle at which the hanging hook 1213 rotates counterclockwise relative to the first guiding bar 112 may be adjusted according to actual needs.

Figure 10A:
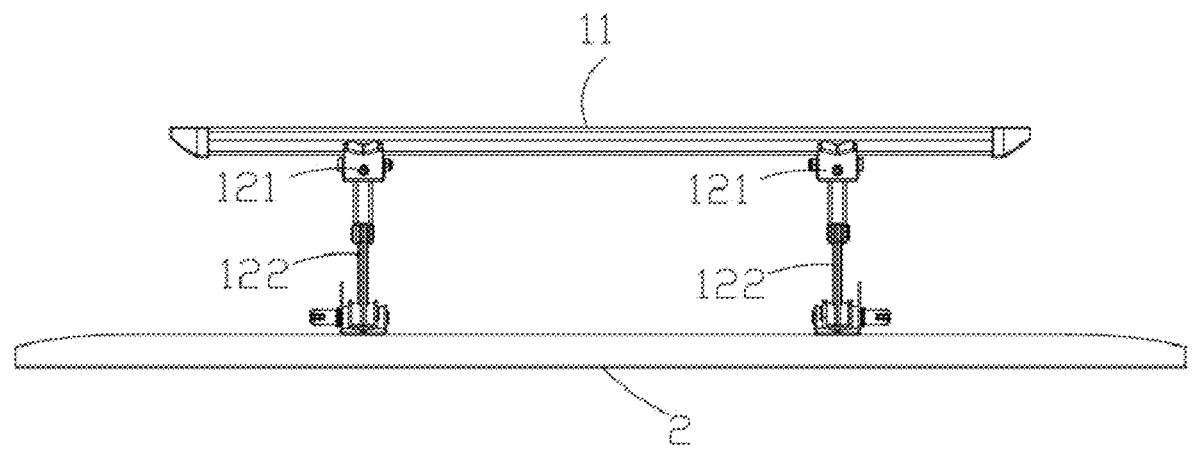
FIG. 10A illustrates a schematic view of the display mounting support in accordance with an embodiment of the present disclosure when the display mounting support is stretched forward.
Figure 10B:
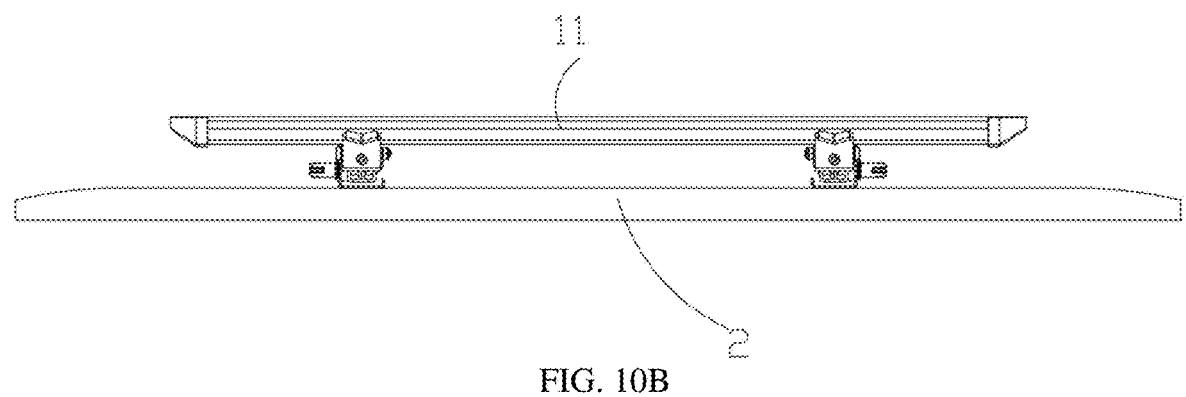
FIG. 10B illustrates a schematic view of the display mounting support in accordance with an embodiment of the present disclosure when the display mounting support is retracted backward.
Figure 10C:
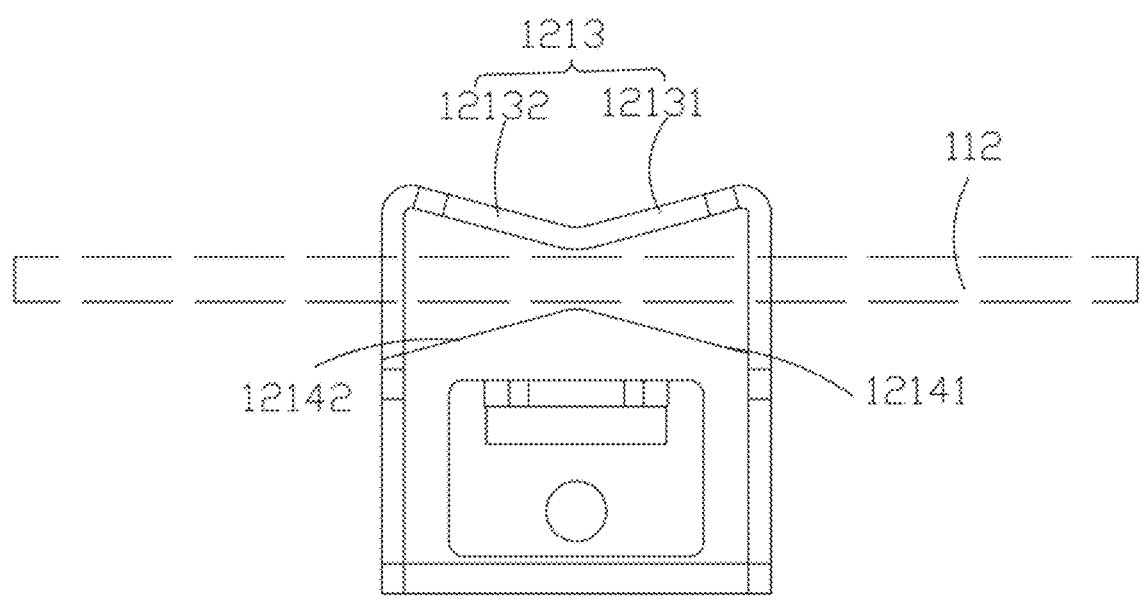
FIG. 10C illustrates a schematic view of a positional relationship between the hanging hook and the first guiding bar in an intermediate position in accordance with an embodiment of the present disclosure.

Referring to FIG. 10A, FIG. 10B, and FIG. 10C, when the hanging hook 1213 is set in parallel relative to the first guiding bar 112, the pointed corners of the first convex structure 12140 and the first concave structure 12130 are held against the first guiding bar 112 on opposite sides of the first guiding bar 112. At this time, the rotation angle of the hanging hook 1213 relative to the first guiding bar 112 is 0 degrees. At this time, when the display 2 is pushed forward and backward, the first convex structure 12140) and the first concave structure 12130 can be held against the opposite sides of the first guiding bar 112, avoiding an empty travel when the display 2 is adjusting a forward and backward retractable distance.

Figure 11A:
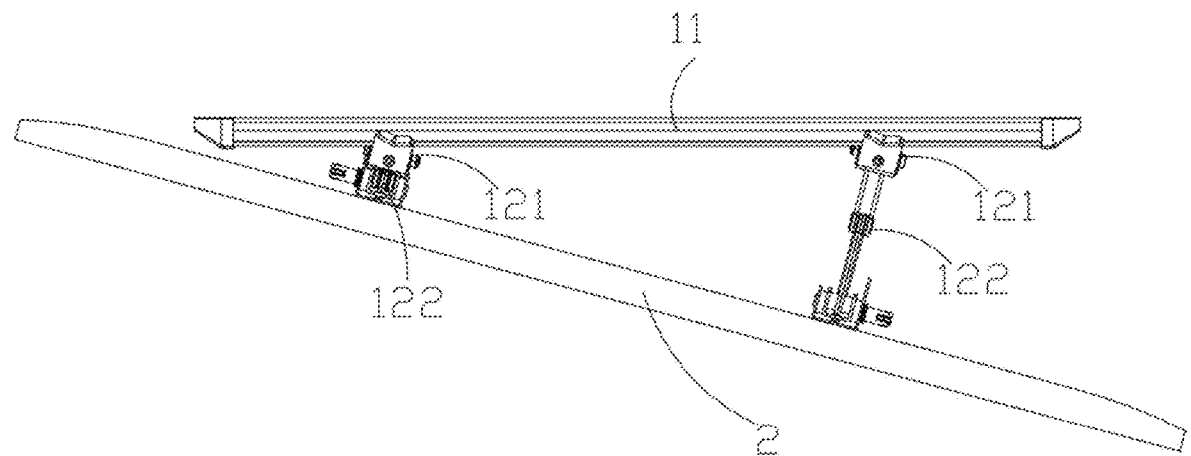
FIG. 11A illustrates a schematic view of the display mounting support being adjusted to the left in accordance with an embodiment of the present disclosure.
Figure 11B:
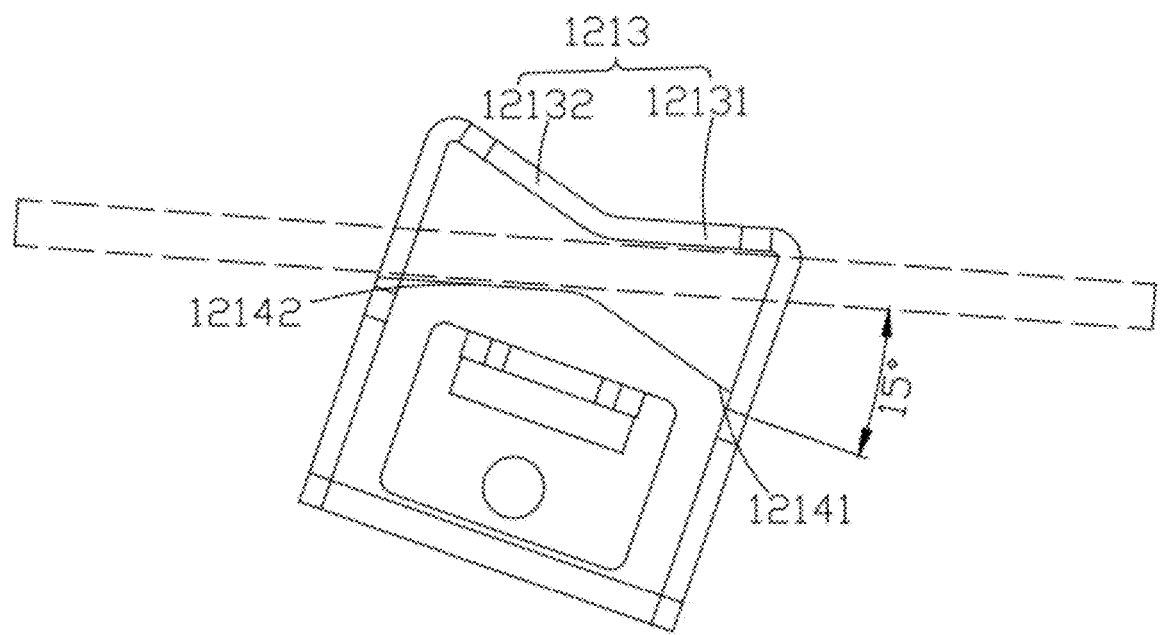
FIG. 11B illustrates a schematic view of a positional relationship between the hanging hook and the first guiding bar in a second limit position in accordance with an embodiment of the present disclosure.

Referring to FIGS. 11A and 11B, when the display 2 is held by hand to be rotated to the left, the hanging hook 1213 is rotated clockwise relative to the first guiding bar 112. When the hanging hook 1213 is rotated clockwise relative to the first guiding bar 112 to a second limit position, the first plate portion 12131 and the fourth plate portion 12142 rest against the opposite sides of the first guiding bar 112, respectively. In this embodiment, the maximum angle at which the hanging hook 1213 rotates clockwise relative to the first guiding bar 112 is +15 degrees. It can be understood that, in other embodiments, the maximum angle at which the hanging hook 1213 rotates clockwise relative to the first guiding bar 112 may be adjusted according to actual needs.

It can be understood that, in some embodiments, one of the first concave structure 12130 and the first convex structure 12140 may be omitted, e.g., either the first concave structure 12130 or the first convex structure 12140 may be omitted.

In other embodiments, when the first concave structure 12130 is omitted, the angle of the first convex structure 12140 may be set smaller, making the first convex structure 12140) be larger in the Y-axis direction so that even if only the first convex structure 12140 is included, the movement gap of the hanging hook 1213 within the hanging hook groove 113 can be minimized. In yet other embodiments, when the first convex structure 12140) is omitted, the angle of the first concave structure 12130 may be set smaller, making the first concave structure 12130 be larger in the Y-axis direction so that even if only the first concave structure 12130 is included, the movement gap of the hanging hook 1213 within the hanging hook groove 113 can be minimized.

In some embodiments, referring again to FIG. 5, the first supporting member 12144 further includes a protruding portion 12143. The protruding portion 12143 is located on a top end of the first supporting member 12144. The protruding portion 12143 protrudes from a side of the top end of the first supporting member 1214 facing the wall plate 11. The protruding portion 12143 includes a supporting concave structure 12144. The supporting concave structure 12144 includes a fifth plate portion 12145 and a sixth plate portion 12146. Adjacent edges of the fifth plate portion 12145 and the sixth plate portion 12146 intersect with each other. The fifth plate portion 12145 is located adjacent to the first plate portion 12131, and the sixth plate portion 12146 is adjacent to the second plate portion 12132. The fifth plate portion 12145 is parallel to the first plate portion 12131 and resists against the inside of the first plate portion 12131. The sixth plate portion 12146 is parallel to the second plate portion 12132 and resists against the inside of the second plate portion 12132.

Therefore, the fifth plate portion 12145 can support the first plate portion 12131, and the sixth plate portion 12146 can support the second plate portion 12132, thereby enhancing the overall structural strength of the hanging hook 1213, and assisting in the positioning of the first supporting member 1214 within the receiving groove 12121.

In some embodiments, referring again to FIG. 5, the connecting rod 1212 includes a first side plate 12122, a second side plate 12123, a front plate 12124, and a top plate 12125. The first side plate 12122 and the second side plate 12123 are located opposite to each other. The front plate 12124 is connected to front ends of the first side plate 12122 and the second side plate 12123, and the cantilever portions 12133 are two. The two cantilever portions 12133 are coplanar with the first side plate 12122 and the second side plate 12123, respectively. The top plate 12125 is connected to the top ends of the first side plate 12122 and the second side plate 12123, and the top ends of the two cantilever portions 12133. The first side plate 12122, the second side plate 12123, the front plate 12124, the top plate 12125, the two cantilever portions 12133 cooperatively form the receiving groove 12121.

In some embodiments, when the first concave structure 12130 is V-shaped, a peripheral wall of the top plate 12125 adjacent the wall plate 11 is in a V-shape that corresponds to the V-shape of the first concave structure 12130 of the hanging hook 1213. It can be understood that, in other embodiments, when the first concave structure 12130 is C-shaped or polygonal shaped, a peripheral wall of the top plate 12125 adjacent the wall plate 11 is in a C-shape or polygonal shape that corresponds to the C-shape or polygonal shape of the first concave structure 12130 of the hanging hook 1213

In some embodiments, the first supporting member 1214 further includes a third side plate 12147 and a fourth side plate 12148. The third side plate 12147 and the fourth side plate 12148 each has an L shape. The third side plate 12147 and the fourth side plate 12148 are located opposite to each other. The third side plate 12147 connects the third plate portion 12141 and the fifth plate portion 12145. The fourth side plate 12148 connects the fourth plate portion 12142 and the sixth plate portion 12146. The third side plate 12147 is located on an inner side of the first side plate 12122 and is parallel to the first side plate 12122. The fourth side plate 12148 is located on an inner side of the second side plate 12123 and is parallel to the second side plate 12123.

Therefore, by the third side plate 12147 affixing to the first side plate 12122 and the fourth side plate 12148 affixing to the second side plate 12123, which improves a positioning accuracy of the first supporting member 1214 within the receiving groove 12121.

In some embodiments, the third side plate 12147 and the fourth side plate 12148 also form an upper and lower through space for passage of other components.

In some embodiments, referring again to FIG. 2, the wall plate 11 further includes a second guiding bar 114. The wall frame 111 and the second guiding bar 114 are connected to form a locking hook groove 115. The locking hook groove 115 extends along a left-right direction of the display mounting support 1. Opening of the locking hook groove 115 and opening of the hanging hook groove 113 are set back to back. The hanging assembly 12 further includes a pull cord assembly 124. The pull cord assembly 124 is connected to the other end of the hanging rod 1211. Referring again to FIG. 5, the pull cord assembly 124 includes a locking hook 1241. When the hanging assembly 12 is hung into the hanging hook groove 113 through the hanging hook 1213, the locking hook 1241 of the pull cord assembly 124 is used to securely and reliably fix the hanging assembly 12 to the wall plate 11 by the locking hook 1241 of the pull cord assembly 124 being snapped into the locking hook groove 115.

Specifically, the locking hook 1241 includes two cantilever arms 12413 and a second concave structure 12410. The second concave structure 12410 is connected between the two cantilever arms 12413. The second concave structure 12410 includes a seventh plate portion 12411 and an eighth plate portion 12412. Adjacent edges of the seventh plate portion 12411 and the eighth plate portion 12412 intersect with each other. The second concave structure 12410 is recessed when viewed from the wall plate 11.

Therefore, compared to the locking hook with a shape of flat plate, by adopting the locking hook 1241 with the second concave structure 12410 in the present disclosure, a size of the locking hook 1241 in the Y-axis direction, i.e., in the thickness direction, can be increased, and therefore, the second concave structure 12410) can occupy more spaces of the locking hook groove 115 in the thickness direction, which reduces the movement gap between the locking hook 1241 and the second guiding bar 114, so that the display mounting support 1 has a smaller movement gap between the locking hook 1241 and the second guiding bar 114 at any angle within the adjustable range of the left-right rotation angles, which can further avoid problems such as empty travel and wobbling caused by the gap between the locking hook 1241 and the second guiding bar 114 being too large.

Figure 12:
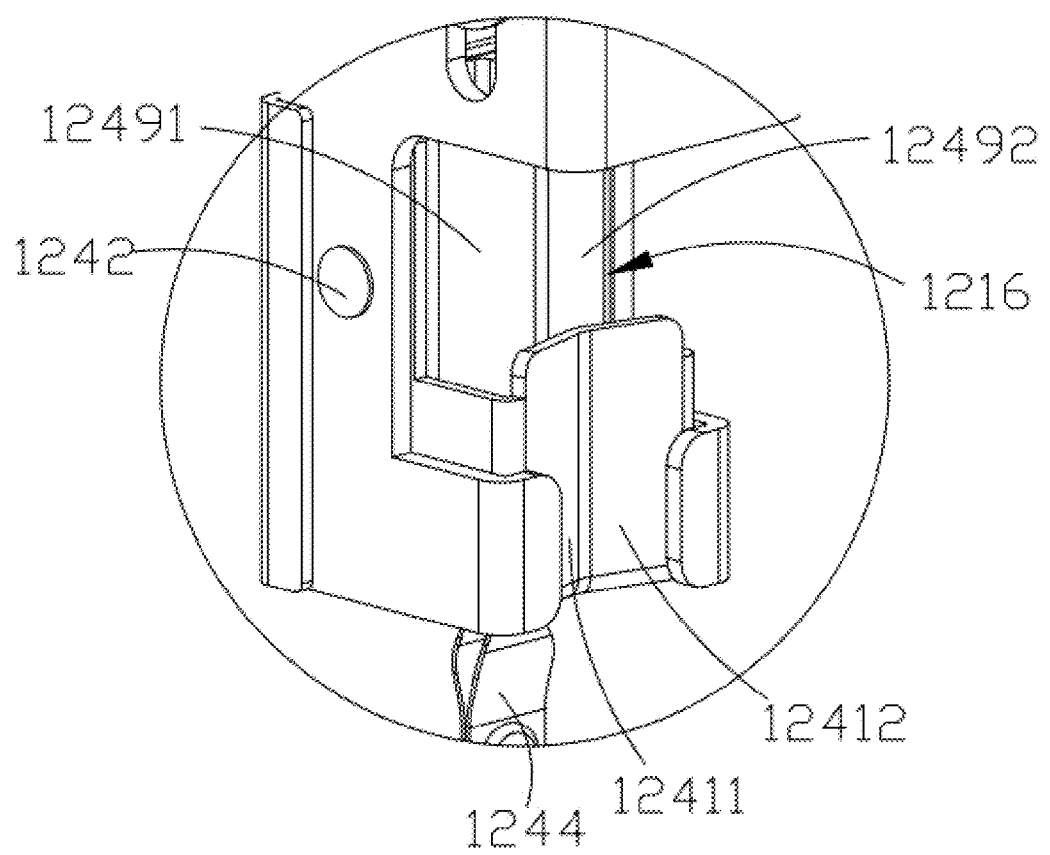
FIG. 12 illustrates a partial enlarged view of FIG. 3 at XII.

Referring to FIGS. 5 and 12, the pull cord assembly 124 further includes a locking member 1240, a shaft 1242, a tension spring 1243, and a pull rope 1244. The locking member 1240 is connected to the other end of the hanging rod 1211. The locking member 1240 includes the locking hook 1241. The locking 1241 is set corresponding to a position of the opening 1216. In some embodiments, the hanging rod 1211 is hollow inside and a side of the other end of the hanging rod 1211 facing the wall plate 11 defines an opening 1216. The locking member 1240 is received inside the other end of the hanging rod 1211 and is partially exposed from the opening 1216. The locking member 1240) further includes a bottom wall 1245, a first sidewall 1246 and a second sidewall 1247. The first sidewall 1246 and the second sidewall 1247 are located opposite to each other. The locking hook 1241 is connected to sides of the first sidewall 1246 and the second sidewall 1247 adjacent to the wall plate 11. The bottom wall 1245 is simultaneously connected to bottom ends of the first sidewall 1246, the second sidewall 1247 and the locking hook 1241. At least one of the first sidewall 1246 and the second sidewall 1247 of the locking member 1240 is slidably coupled to the other end of the hanging rod 1211 by the shaft 1242 to provide guidance for sliding of the locking member 1240 relative to the hanging rod 1211. At least one of the first sidewall 1246 and the second sidewall 1247 defines a first limiting groove 1248 extending along a height direction of the display mounting support 1. The hanging rod 1211 defines a shaft hole 1215 correspondingly. The shaft 1242 passes through the first limiting groove 1248 and is fixed in the shaft hole 1215. In other embodiments, the first limiting groove 1248 may be defined on the hanging rod 1211, and the shaft hole 1215 may be defined on at least one of the first sidewall 1246 and the second sidewall 1247. The tension spring 1243 is located in the locking member 1240, and one end of the tension spring 1243 is connected to the shaft 1242 and the other end of the tension spring 1243 is fixed to the bottom wall 1245 of the locking member 1240. The pull rope 1244 is located outside of the locking member 1240, and the pull rope 1244 is secured to the bottom wall 1245 of the locking member 1240). It can be understood that the pull rope 1244 and the tension spring 1243 may be secured to different locations on the bottom wall 1245, for example, the bottom wall 1245 includes a first post and a second post, the pull rope 1244 is coupled to the first post and the tension spring 1243 is coupled to the second post. In other embodiments, the bottom wall may include only one post, and the pull rope 1244 and the tension spring 1243 are both connected to the post.

Therefore, when pulled downwardly by the pull rope 1244, the locking member 1240) follows the pull rope 1244 downwardly within a travel allowed by the first limiting groove 1248, the tension spring 1243 is stretched, and when the locking member 1240) is moved downwardly to a position where the locking hook 1241 is lower than a lower edge of the second guiding bar 114, the locking hook 1241 can be removed from the locking hook groove 115, the pull cord assembly 124 is unlocked, and the hanging assembly 12 as a whole can be removed from the wall plate 11. Conversely, when the hanging assembly 12 needs to be mounted on the wall plate 11, the hanging hook 1213 of the hanging assembly 12 is first snapped into the hanging hook groove 113, and then the pull rope 1244 is pulled down such that the locking member 1240 follows the pull rope 1244 to move downwardly within the travel allowed by the first limiting groove 1248, the tension spring 1243 is stretched, and when the locking member 1240 moves downwardly until the position of the locking hook 1241 is lower than the lower edge of the second guiding bar 114, the pull cord assembly 124 is pushed toward the side close to the wall plate 11, and the locking hook 1241 can enter the locking hook groove 115, releasing the pull rope 1244. The locking hook 1241 snaps to the locking hook groove 115 under the elastic restoring force of the tension spring 1243, and the hanging assembly 12 can be mounted to the wall plate 11.

In some embodiments, the pull cord assembly 124 further includes a second supporting member 1249. The second supporting member 1249 is located within the locking member 1240. The second supporting member 1249 includes a second convex structure 12490 on a side of the second supporting member 1249 facing the locking hook 1241. The second convex structure 12490 includes a ninth plate portion 12491 and a tenth plate portion 12492. The ninth plate portion 12491 is adjacent to the seventh plate portion 12411, and the tenth plate portion 12492 is adjacent to the eighth plate portion 12412. Adjacent edges of the ninth plate portion 12491 and the tenth plate portion 12492 intersect with each other. The second convex structure 12490 is protruded when viewed from the wall plate 11. A minimum distance between the second convex structure 12490) and the second concave structure 12410 is greater than or equal to the thickness of the second guiding bar 114.

Therefore, in the present disclosure, due to the addition of the second convex structure 12490, the second convex structure 12490 and the second concave structure 12410 are set back to back, which can further reduce the movement gap of the locking hook 1241 relative to the second guiding bar 114, and reduce wobbling of the locking hook 1241 relative to the second guiding bar 114 without affecting the adjustment of the left-right rotation angle, thereby enhancing the user experience.

In some embodiments, the second supporting member 1249 is a plastic member. It can be understood that in other embodiments, the second supporting member 1249 may also be a metal member, etc., without limitation herein.

In some embodiments, the second concave structure 12410 and the second convex structure 12490 are both V-shaped. Correspondingly, the ninth plate portion 12491, the seventh plate portion 12411, the tenth plate portion 12492, and the eighth plate portion 12412 may be in the form of a planar plate. The ninth plate portion 12491 and the seventh plate portion 12411 together form a V-shaped angle. The tenth plate portion 12492 and the eighth plate portion 12412 together form a V-shaped angle. The seventh plate portion 12411 and the tenth plate portion 12492 are parallel, a distance between the planes where each of the seventh plate portion 12411 and the tenth plate portion 12492 is located is greater than or equal to a thickness of the second guiding bar 114, and a difference between the distance between the planes where each of the seventh plate portion 12411 and the tenth plate portion 12492 and the thickness of the second guiding bar 114 is 0.0 mm to 1.5 mm. The eighth plate portion 12412 and the ninth plate portion 12491 are provided in parallel, a distance between the planes where each of the eighth plate portion 12412 and the ninth plate portion 12491 is located is greater than or equal to the thickness of the second guiding bar 114, and the difference between the distance between the planes where each of the eighth plate portion 12412 and the ninth plate portion 12491 and the thickness of the second guiding bar 114 is 0.0 mm to 1.5 mm. It can be understood that, in other embodiments, a range of the difference may be adjusted according to the actual needs.

Therefore, through the mutual cooperation of the seventh plate portion 12411 and the tenth plate portion 12492, and the mutual cooperation of the eighth plate portion 12412 and the ninth plate portion 12491, the movement gap of the locking hook 1241 relative to the second guiding bar 114 can be further narrowed, which makes the limit more reliable and stable when the locking hook 1241 is rotated to the limit position relative to the second guiding bar 114.

It can be understood that in other embodiments, the second concave structure 12410 and the second convex structure 12490 may be in a shape of a C-shape or a polygon, etc., respectively, and will not be limited herein.

It can be understood that in some embodiments, one of the second convex structure 12490 and the second concave structure 12410 may be omitted, for example, the second convex structure 12490 or the second concave structure 12410 may be selectively omitted.

In other embodiments, when the second concave structure 12410 is omitted, the angle of the second convex structure 12490) may be set smaller, allowing the second convex structure 12490 to have a larger size in the Y-axis direction, so that even if only the second convex structure 12490 is included, the movement gap of the locking hook 1241 within the locking hook groove 115 may be minimized. In yet other embodiments, when the second convex structure 12490 is omitted, the angle of the second concave structure 12410 may be set smaller, allowing the second concave structure 12410 to have a larger size in the Y-axis direction in the Y-axis direction, so that even if only the second concave structure 12410 is included, the movement gap of the locking hook 1241 within the locking hook groove 115 may be minimized.

In some embodiments, the second supporting member 1249 further includes a fifth side plate 12493, a sixth side plate 12494, and a second front plate 12495. The fifth side plate 12493 and the sixth side plate 12494 are located opposite to each other. The second front plate 12495 and the second convex structure 12490) are located opposite to each other. The fifth side plate 12493, the sixth side plate 12494, the second front plate 12495 and the second convex structure 12490 cooperatively form a rectangular space. The tension spring 1243 is located within the rectangular space. Correspondingly, the fifth side plate 12493 and the sixth side plate 12494 each defines a perforation 12496 corresponding to the position of the shaft hole 1215. The shaft 1242 are threaded within the first limiting grooves 1248, the shaft holes 1215 and the perforations 12496.

Therefore, the second supporting member 1249 is an enclosing structure with greater structural strength and better support.

Figure 13:
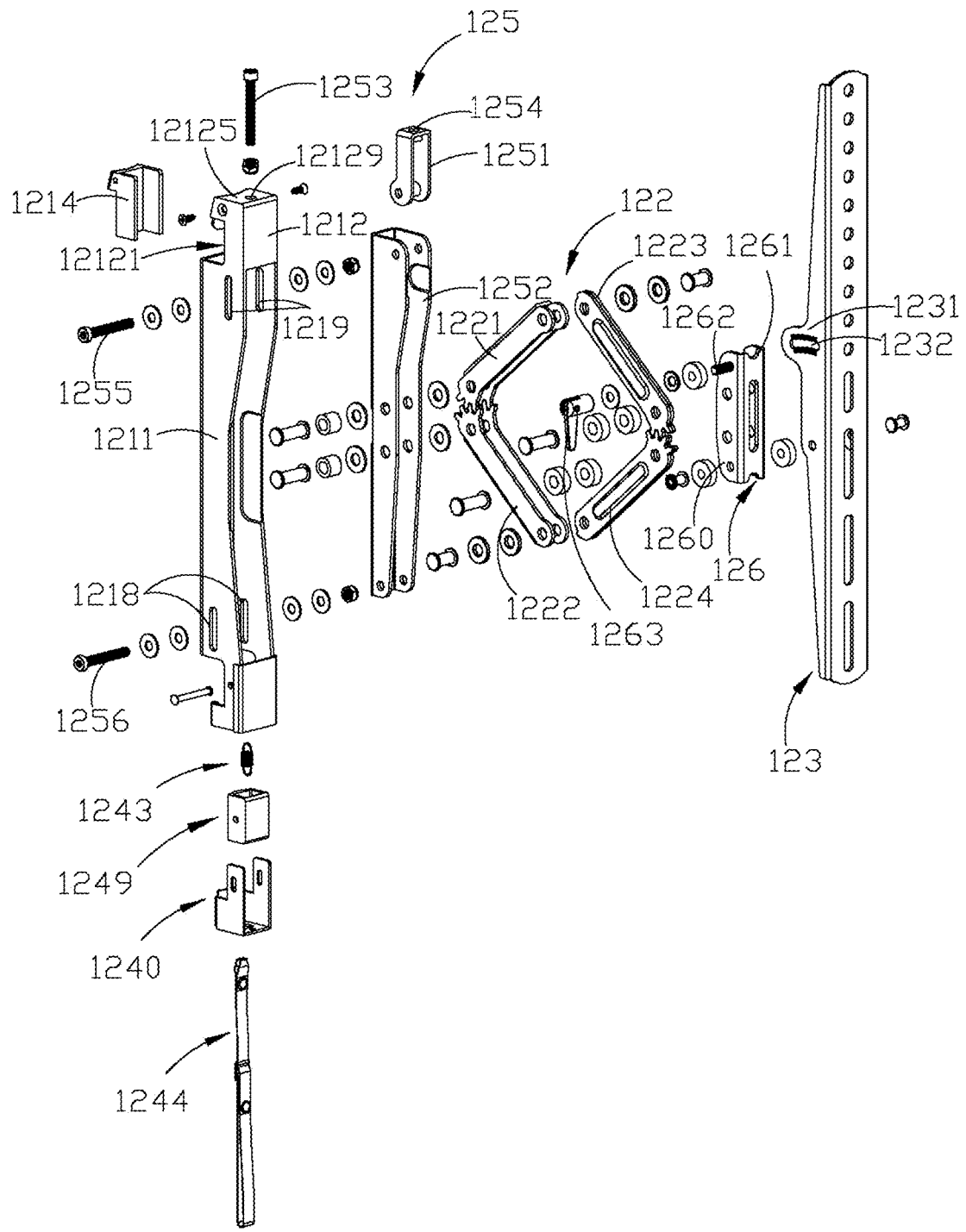
FIG. 13 illustrates an exploded view of the hanging assembly in FIG. 2.

In some embodiments, referring to FIG. 13, the hanging assembly 12 further includes a height adjustment mechanism 125. The height adjustment mechanism 125 is configured to adjust a height of the display 2. Specifically, the height adjusting mechanism 125 includes a first height adjusting member 1251, a second height adjusting member 1252, and a height adjusting bolt 1253. The first height adjusting member 1251 is received in the receiving groove 12121 of the connecting rod 1212 and passes through the first supporting member 1214. The second height adjusting member 1252 is located within the hanging rod 1211. The first height adjusting member 1251 is connected to the second height adjusting member 1252. The first height adjusting member 1251 defines a first bolt hole 1254 at a top of the first height adjusting member 1251. The top plate 12125 defines a second bolt hole 12129. The height adjusting bolt 1253 passes through the first bolt hole 1254 and the second bolt hole 12129 to connect the first height adjusting member 1251 to the top plate 12125. The height adjusting bolt 1253 adjusts the relative positions of the first height adjusting member 1251 and the second height adjusting member 1252 within the hanging hook member 121. The second height adjusting member 1252 is connected to the retractable mechanism 122.

Figure 14:
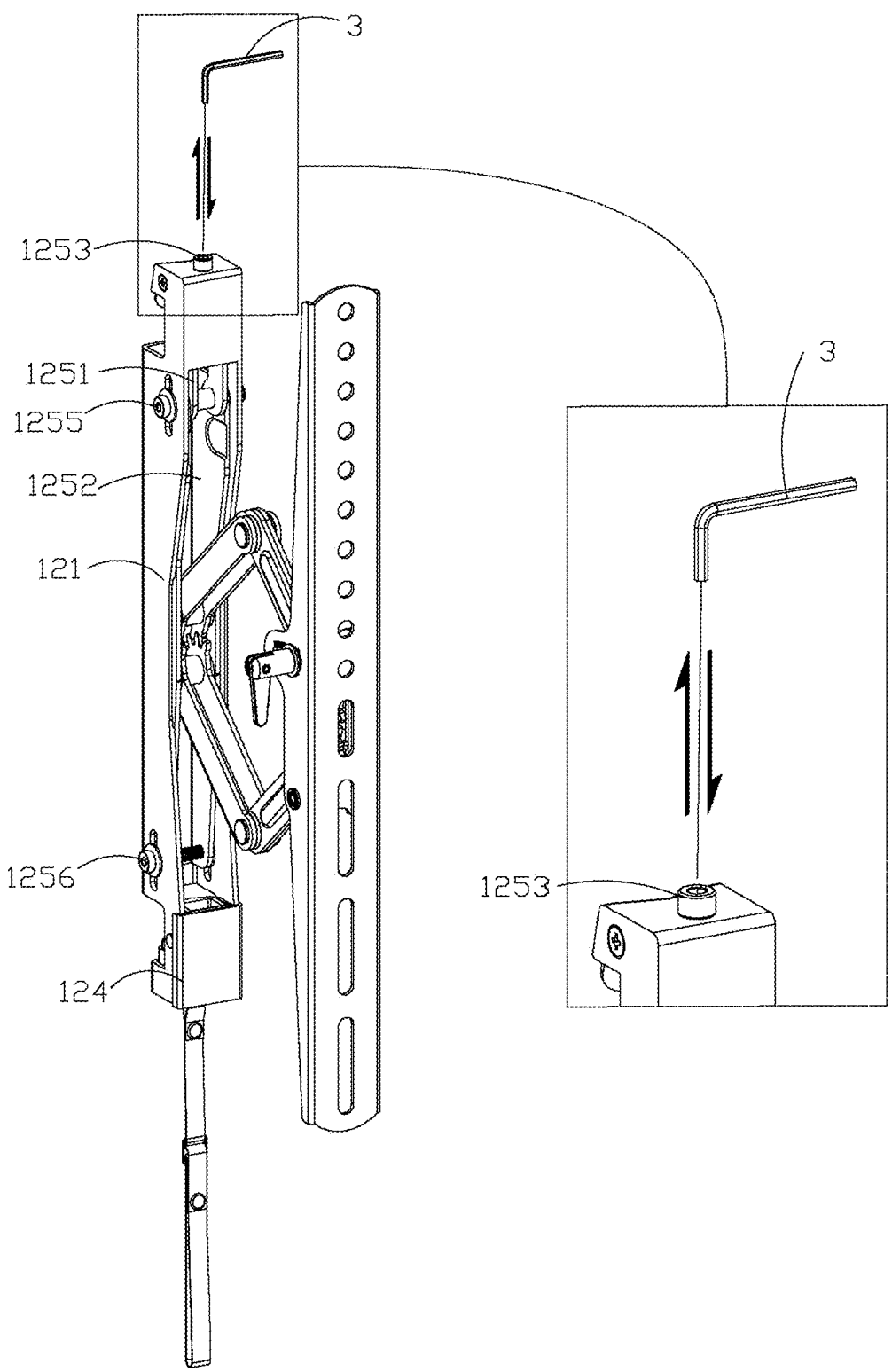
FIG. 14 illustrates a schematic view of height adjustment.
Figure 15:
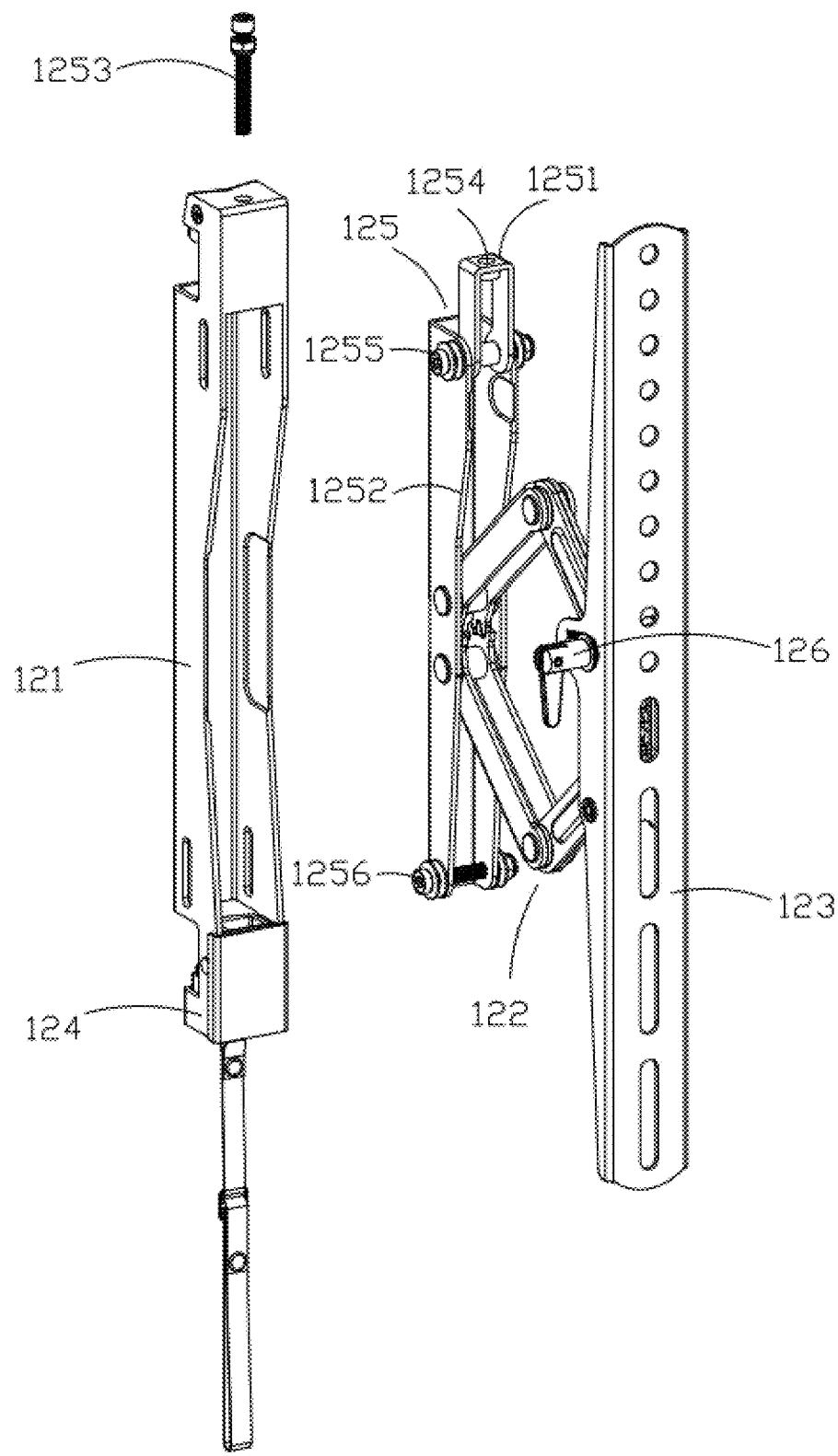
FIG. 15 illustrates a schematic view of partial assembly of the hanging assembly in FIG. 13.

Referring to FIGS. 14 and 15, when the horizontal degree of the display 2 needs to be fine-tuned, the height adjustment bolt 1253 can be rotated using a tool 3 to adjust the height of the height adjustment mechanism 125 as a whole relative to the hanging hook member 121.

Therefore, since the two hanging assemblies 12 each includes a height adjusting mechanism 125, the two height adjusting mechanisms 125 can be adjusted separately, so as to adjust the horizontal degree of the display 2. When the horizontal degree of the wall plate 11 mounted on the wall is not sufficient, the two hanging assemblies 12 can be fine-adjusted by using the two height adjusting mechanisms 125, so that the display 2 reaches the required horizontal degree.

In some embodiments, the first height adjustment member 1251 has a substantially U-shaped cross-section in the Y-axis direction. A size of the first height adjustment member 1251 in the Y-axis direction is smaller than that of the first supporting member 1214 in the Y-axis direction. A size of the first height adjustment member 1251 in the Y-axis direction is smaller than that of the second height adjustment member 1252 in the Y-axis direction. Both the hanging rod 1211 and the second height adjustment member 1252 have a substantially U-shaped cross-section in the Z-axis direction. The U-shaped structure of the second height adjustment member 1252 is located within the U-shaped structure of the hanging rod 1211. The hanging rod 1211 and the second height adjustment member 1252 have substantially same sizes in the Y-axis direction.

In some embodiments, the height adjustment mechanism 125 further includes a first guiding bolt 1255. The first height adjustment member 1251 is connected to the second height adjustment member 1252 by the first guiding bolt 1255. The hanging rod 1211 defines a second limiting groove 1219 corresponding to a position of the first guiding bolt 1255. The second limiting groove 1219 extends along a Z-axis direction. The first guiding bolt 1255 is also threaded into the second limiting groove 1219. The second limiting groove 1219 can limit a height adjustment travel of the height adjustment mechanism 125, and can act as a guide for the movement in the height direction.

In some embodiments, the second height adjustment member 1252 defines a third limiting groove 1218 on a bottom end thereof. The third limiting groove 1218 extends along the Z-axis direction. The height adjustment mechanism 125 further includes a second guiding bolt 1256. The second guiding bolt 1256 is also threaded into the third limiting groove 1218. The second height adjustment member 1252 is connected to the hanging rod 1211 by the second guiding bolt 1256. Therefore, the ends of the second height adjustment member 1252 are limited and guided by the first guiding bolt 1255 and the second guiding bolt 1256, respectively, for better travel stability.

In some embodiments, referring again to FIG. 13, the retractable mechanism 122 includes a first gear arm 1221, a second gear arm 1222, a third gear arm 1223, and a fourth gear arm 1224. The first gear arm 1221, the second gear arm 1222, the third gear arm 1223, and the fourth gear arm 1224 are connected in a quadrilateral structure. Ends of the first gear arm 1221 and the second gear arm 1222 are connected by gear meshing and simultaneously pivotally connected to the second height adjustment member 1252. Ends of the third gear arm 1223 and the fourth gear arm 1224 are connected by gear meshing and simultaneously pivotally connected to the display hanging member 123. The first gear arm 1221 is pivotally connected to the third gear arm 1223, and the second gear arm 1222 is pivotally connected to the fourth gear arm 1224. In other embodiments, the retractable mechanism 122 is not limited to the above-described structure, but may also be other types of retractable mechanisms, which are not limited herein.

Therefore, the retractable distance of the display mounting support 1 in the Y-axis direction can be adjusted by the retractable mechanism 122.

In this embodiment, when the display mounting support 1 includes the height adjustable mechanism 125, ends of the first gear arm 1221 and the second gear arm 1222 are connected by gear meshing and simultaneously pivotally connected to the second height adjusting member 1252. It can be understood that in other embodiments, the height adjustment mechanism 125 may be omitted, so that ends of the first gear arm 1221 and the second gear arm 1222 are connected by gear meshing and simultaneously pivotally connected to the hanging rod 1211.

In some embodiments, referring again to FIG. 13, the display mounting support 1 further includes a tilt adjustment mechanism 126. The tilt adjustment mechanism 126 includes a mounting member 1261 and an adjustment handle 1263. The mounting member 1261 is pivotally coupled to sides of the third gear arm 1223 and the fourth gear arm 1224 away from the wall plate 11. The mounting member 1261 is substantially U-shaped with an opening facing the third gear arm 1223 and the fourth gear arm 1224. The mounting member 1261 includes a screw: 1262 located on sidewall 1260 thereof. A central axis of the screw 1262 extends in the X-axis direction. The display hanging member 123 further includes a lug portion 1231 located on sidewall thereof. The lug portion 1231 defines an arcuate groove 1232. The screw 1262 passes through the arcuate groove 1232. The adjustment handle 1263 is threadedly connected to the screw: 1262. When the screw: 1262 is located in different positions of the arcuate groove 1232, the display hanging member 123 has different downward tilt angles or upward tilt angles relative to the mounting member 1261.

Therefore, the downward tilt angles or upward tilt angles of the display 2 can be adjusted by the tilt adjustment mechanism 126.

In other embodiments, the tilt adjustment mechanism 126 may be omitted, and the display hanging member 123 is fixedly connected to a side of the retractable mechanism 122 away from the wall plate 11.

Figure 16:
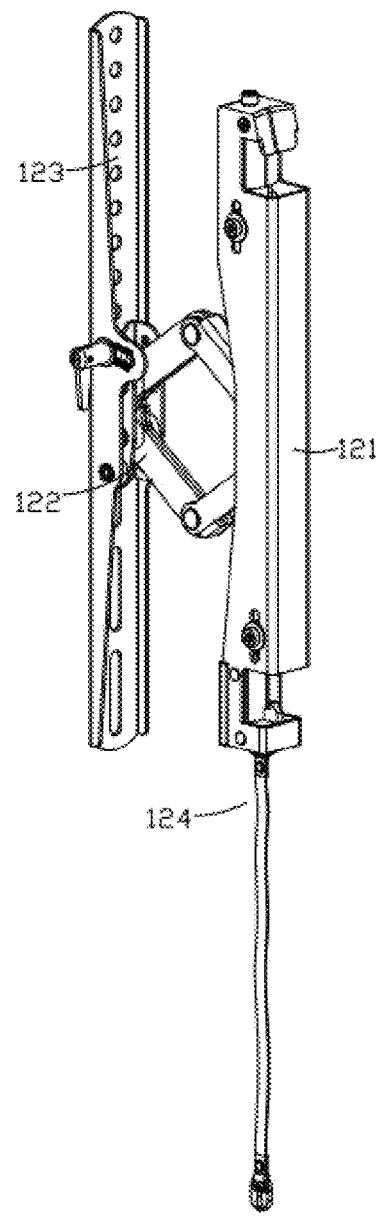
FIG. 16 illustrates a three-dimensional structural schematic view of the hanging assembly in accordance with another embodiment of the present disclosure.
Figure 17:
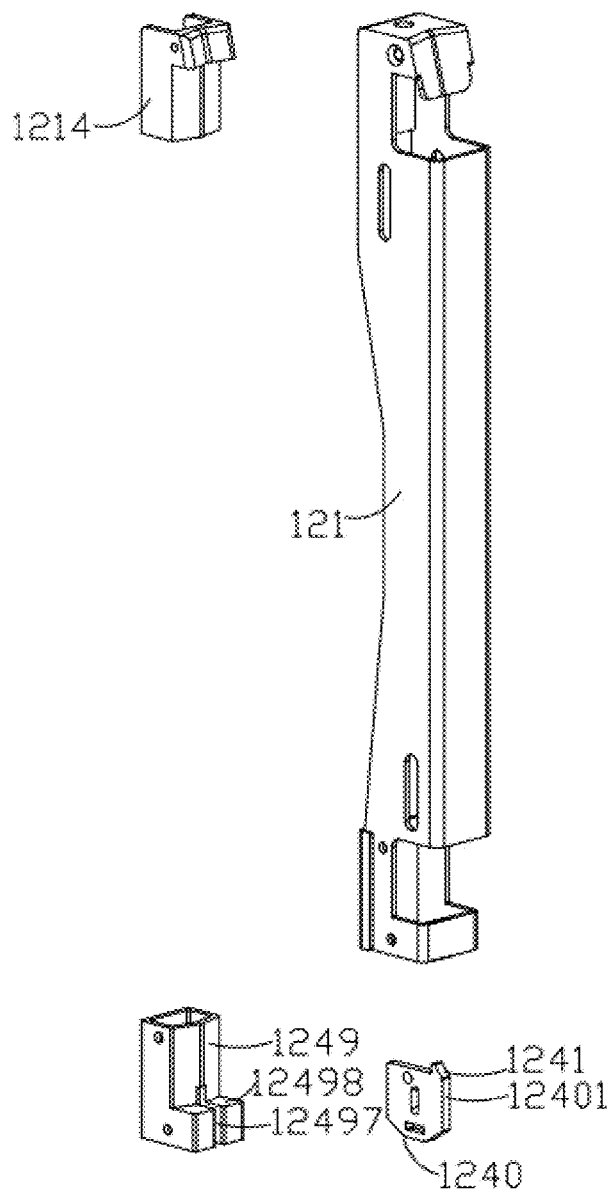
FIG. 17 illustrates a partial exploded view of the hanging assembly in FIG. 16.
Figure 18:
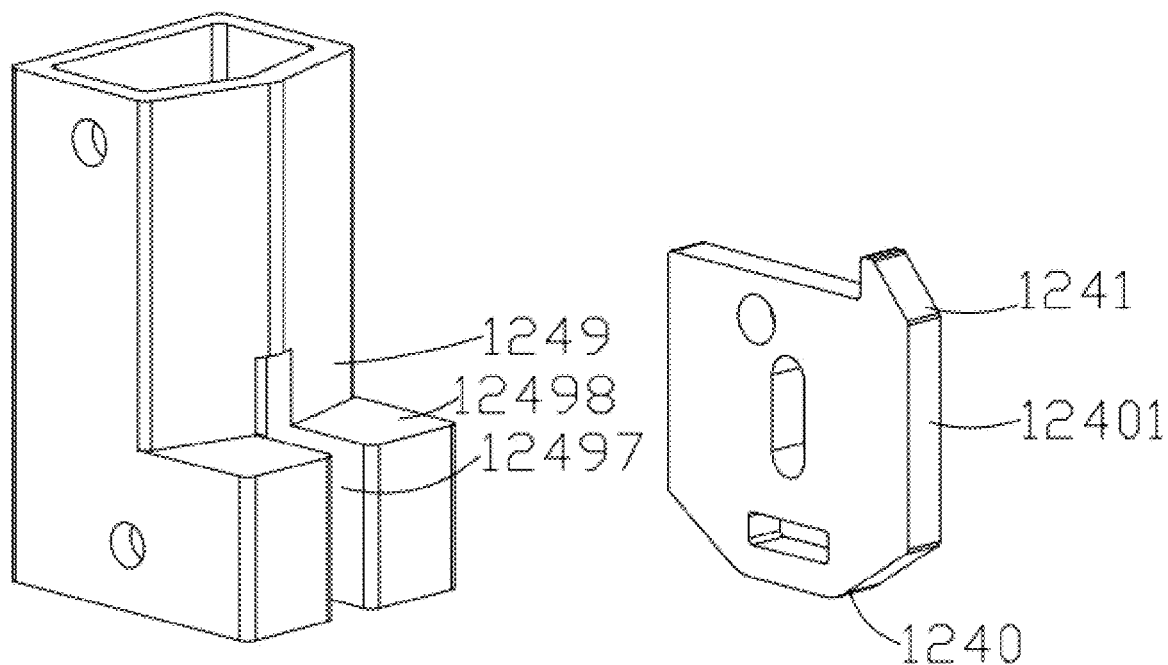
FIG. 18 illustrates a partial enlarged view of FIG. 17.

Referring to FIGS. 16, 17, and 18, FIG. 16 illustrates a three-dimensional structural schematic view of the hanging assembly in accordance with another embodiment of the present disclosure: FIG. 17 illustrates a partial exploded view of the hanging assembly in FIG. 16; FIG. 18 illustrates a partial enlarged view of FIG. 17.

In this embodiment, the pull rod assembly 124 includes a locking member 1240 and a second supporting member 1249. The locking member 1240 includes the locking hook 1241, but the second concave structure included in the locking hook 1241 may be omitted. The second supporting member 1249 defines an inserting groove 12497. The inserting groove 12497 penetrates through the bottom surface of the second supporting member 1249 along the height direction. The locking member 1240 includes an inserting portion 12401 and the locking hook 1241. The locking hook 1241 is connected to one side of the inserting portion 12401. The inserting portion 12401 is inserted into the inserting groove 12497. The locking hook 1241 is located outside of the inserting groove 12497 and is located opposite and spaced apart from the second convex structure 12490 of the second supporting member 1249 to form a snapping space for snapping into the locking hook groove 115.

Therefore, since the inserting groove 12497 is a groove extending in the height direction, the locking member 1240 can slide up and down within the inserting groove 12497 relative to the second supporting member 1249. A pull rope 1244 may be attached to the locking member 1240. The pull rope 1244 may pull the locking member 1240 downwardly, causing the locking member 1240 to disengage from the locking hook groove 115.

In some embodiments, a tab 12498 is formed at a bottom position of the second supporting member 1249, and the inserting groove 12497 is also formed on the tab 12498, which can increase a formation space of the inserting groove 12497, so that there is more contact area between the inserting portion 12401 and the inserting groove 12497, and improve the structural stability.

In some embodiments, a guiding member is provided between the locking member 1240) and the second supporting member 1249, the guiding member may provide a guiding effect on the up and down sliding of the locking member 1240 relative to the second supporting member 1249. Obviously, the guiding member may be, but is not limited to, a guiding shaft and a guiding groove fit, and the guiding groove may be defined on at least one of the locking member 1240) and the second supporting member 1249. In this embodiment, the guiding groove is defined on the inserting portion 12401.

In some embodiments, a reset spring is also located between the locking member 1240) and the second supporting member 1249, the reset spring acts as a reset for downward movement of the locking member 1240 relative to the second supporting member 1249.

The above description of the technical solution of the subject matter of the present disclosure as well as the corresponding details are described above, and it can be understood that the above description is only at least one embodiment of the technical solution of the subject matter of the present disclosure, and some of the details can also be omitted in its specific implementation.

In addition, in at least one embodiment of the above present disclosure, there are multiple embodiments of the combination of implementation possibilities, various combination programs are limited to space will not be listed. The technical personnel in the field can freely combine the implementation of the above embodiments according to the needs of the specific implementation, in order to obtain a better application experience.

In summary, it can be understood that the present disclosure has the above mentioned excellent characteristics, so that it can be used to enhance the effectiveness of the previous technology has not been practical, and become a very practical value of the product.

The above is only a better example of the present disclosure, and is not intended to limit the present disclosure. Any modification, equivalent substitution or improvement made within the ideas and principles of the present disclosure shall be included in the scope of protection of the present disclosure.

What is claimed is:

1. A display mounting support, wherein the display mounting support comprises:
   a wall plate, wherein: the wall plate comprises a wall frame and a first guiding bar; the wall frame is configured to be mounted on a wall surface, the wall frame and the first guiding bar are connected to form a hanging hook groove, the hanging hook groove extends along a left-right direction of the display mounting support; and
   at least one hanging assembly, wherein: the at least one hanging assembly is hung into the hanging hook groove of the wall plate; each hanging assembly comprises a hanging hook member, a retractable mechanism and a display hanging member; the hanging hook member comprises a hanging rod, a connecting rod and a hanging hook; the connecting rod is connected between one end of the hanging rod and one side of the hanging hook; the hanging hook comprises a cantilever portion and a first concave structure; the cantilever portion is connected to one end of the connecting rod away from the hanging rod and towards the wall plate; the first concave structure comprises a first plate portion and a second plate portion; the first plate portion and the second plate portion are disposed side by side on one side of the cantilever portion facing the wall plate and extending towards the hanging rod; adjacent edges of the first plate portion and the second plate portion intersect with each other; the first concave structure is recessed when viewed from the wall plate; the retractable mechanism is connected between the hanging rod and the display hanging member; the display hanging member is configured to be connected to a predetermined position on a back of a display; and the hanging hook is inserted into the hanging hook groove for hanging the display on the wall plate.

2. The display mounting support according to claim 1, wherein: the connecting rod is hollow and open on a side facing the wall plate to form a receiving groove; the hanging hook member further comprises a first supporting member; the first supporting member is received in the receiving groove; the first supporting member comprises a first convex structure on a side facing the hanging hook; the first convex structure comprises a third plate portion and a fourth plate portion; the third plate portion is adjacent to the first plate portion; the fourth plate portion is adjacent the second plate portion; adjacent edges of the third plate portion and the fourth plate portion intersect with each other; the first convex structure is protruded when viewed from the wall plate; and a minimum distance between the first convex structure and the first concave structure is greater than or equal to a thickness of the first guiding bar.

3. The display mounting support according to claim 2, wherein: the third plate portion and the second plate portion are parallel, and a distance between planes where each of the third plate portion and the second plate portion is located is greater than or equal to a thickness of the first guiding bar; the first plate portion and the fourth plate portion are parallel; and a distance between planes where each of the first plate portion and the fourth plate portion is located is greater than or equal to a thickness of the first guiding bar.

4. The display mounting support according to claim 2, wherein the first concave structure is a V-shaped structure, and the first convex structure is correspondingly also a V-shaped structure.

5. The display mounting support according to claim 2, wherein: the first supporting member further comprises a protruding portion; the protruding portion comprises a fifth plate portion and a sixth plate portion; adjacent edges of the fifth plate portion and the sixth plate portion intersect with each other; the fifth plate portion is adjacent to and parallel to the first plate portion; the sixth plate portion is adjacent to and parallel to the second plate portion; when the first supporting member is received in the receiving groove, the fifth plate portion resists against inside of the first plate portion; and the sixth plate portion resists against inside of the second plate portion.

6. The display mounting support according to claim 1, wherein: the wall plate further comprises a second guiding bar, the wall frame and the second guiding bar are connected to form a locking hook groove, the locking hook groove extends along a left-right direction of the display mounting support, opening of the locking hook groove and opening of the hanging hook groove are set back to back; the at least one hanging assembly further comprises a pull cord assembly, the pull cord assembly is connected to the other end of the hanging rod; the pull cord assembly comprises a locking hook, the locking hook comprises two cantilevers and a second concave structure; the second concave structure is connected between the two cantilevers; the second concave structure comprises a seventh plate portion and an eighth plate portion; adjacent edges of the seventh plate portion and the eighth plate portion intersect with each other; the second concave structure is recessed when viewed from the wall plate; and the locking hook of the at least one hanging assembly is inserted into the locking hook groove for locking the at least one hanging assembly on the wall plate.

7. The display mounting support according to claim 6, wherein: the hanging rod is hollow inside, and, a side of the other end of the hanging rod facing the wall plate defines an opening; the pull cord assembly further comprises a locking member, a shaft, a tension spring and a pull rope; the locking member is received inside the other end of the hanging rod and partially exposed from the opening; the locking member comprises a bottom wall, a first sidewall, a second sidewall and a locking hook; the first sidewall and the second sidewall are located opposite to each other; the locking hook is connected to sides of the first sidewall and the second sidewall adjacent the wall plate; the bottom wall is connected to bottom ends of the first sidewall, the second sidewall and the locking hook simultaneously; at least one of the first sidewall and the second sidewall defines a first limiting groove extending along a height direction of the display mounting support; the hanging rod defines a shaft hole correspondingly; the shaft passes through the first limiting groove and is fixed in the shaft hole; the tension spring is located in the locking member; one end of the tension spring is connected to the shaft, and the other end of the tension spring is fixed to the bottom wall of the locking member; and the pull rope is located outside of the locking member and is fixed to the bottom wall of the locking member.

8. The display mounting support according to claim 7, wherein: the pull cord assembly further comprises a second supporting member; the second supporting member is located within the locking member; the second supporting member comprises a second convex structure on a side of the second supporting member facing the locking hook; the second convex structure comprises a ninth plate portion and a tenth plate portion; the ninth plate portion is adjacent to the seventh plate portion; the tenth plate portion is adjacent to the eighth plate portion; adjacent edges of the ninth plate portion and the tenth plate portion intersect with each other; the second convex structure is protruded when being viewed from the wall plate; and a minimum distance between the second convex structure and the second concave structure is greater than or equal to a thickness of the second guiding bar.

9. The display mounting support according to claim 8, wherein: the seventh plate portion and the tenth plate portion are parallel; a distance between planes where each of the seventh plate portion and the tenth plate portion is located is greater than or equal to a thickness of the second guiding bar; the eighth plate portion and the ninth plate portion are parallel; and a distance between planes where each of the eighth plate portion and the ninth plate portion is located is greater than or equal to a thickness of the second guiding bar.

10. The display mounting support according to claim 8, wherein the second concave structure is a V-shaped structure, and the second convex structure is correspondingly also a V-shaped structure.

11. The display mounting support according to claim 2, wherein: the display mounting support further comprises a height adjusting mechanism; the height adjusting mechanism comprises a first height adjusting member, a second height adjusting member, and a height adjusting bolt; the first height adjusting member is located within the receiving groove of the connecting rod and passes through the first supporting member; the second height adjusting member is located with the hanging rod, the first height adjusting member is connected with the second height adjusting member; the first height adjusting member defines a first bolt hole at a top of the first height adjusting member; a top plate of the connecting rod defines a second bolt hole; the height adjusting bolt passes through the first bolt hole and the second bolt hole so as to connect the first height adjusting member with the top plate of the connecting rod; the height adjusting bolt adjusts a relative position of the first height adjusting member and the second height adjusting member within the hanging hook member; and the second height adjusting member is connected to the retractable mechanism.

12. The display mounting support according to claim 1, wherein: the retractable mechanism comprises a first gear arm, a second gear arm, a third gear arm and a fourth gear arm; the first gear arm, the second gear arm, the third gear arm and the fourth gear arm are connected in a quadrilateral structure; ends of the first gear arm and the second gear arm are connected by gear meshing and simultaneously pivotally connected to the at least one hanging member; ends of the third gear arm and the fourth gear arm are connected by gear meshing and simultaneously pivotally connected to the display hanging member; the first gear arm is pivotally connected to the third gear arm; and the second gear arm is pivotally connected to the fourth gear arm.

13. The display mounting support according to claim 1, wherein: the display mounting support further comprises a tilt adjusting mechanism; the tilt adjusting mechanism comprises a mounting member and an adjusting handle; the mounting member is secured to the hanging hook member; the mounting member comprises a screw located on a sidewall thereof; the display hanging member further comprises a lug portion located on a sidewall thereof; the lug portion defines an arcuate groove; the screw passes through the arcuate groove; the adjusting handle is threadedly connected with the screw; and when the screw is located at different positions of the arcuate groove, the display hanging member has different front-to-rear tilting angles relative to the mounting member.

14. A display mounting support, wherein the display mounting support comprises:
a wall plate, wherein: the wall plate comprises a wall frame and a first guiding bar; the wall frame is configured for fixing to a wall surface; the wall frame and the first guiding bar are connected to form a hanging hook groove; and the hanging hook groove extends along a left-right direction of the display mounting support; and
at least one hanging assembly, wherein: the at least one hanging assembly is hung into different positions of the hanging hook groove of the wall plate; each hanging assembly comprises a hanging hook member, a retractable mechanism and a display hanging member; the hanging hook member comprises a hanging rod, a connecting rod and a hanging hook; the connecting rod is connected between one end of the hanging rod and one side of the hanging hook; the connecting rod is hollow and open on a side facing the wall plate to form a receiving groove: a first supporting member is received in the receiving groove; the first supporting member comprises a first convex structure on a side facing the hanging hook; the first convex structure comprises a first plate portion and a second plate portion; adjacent edges of the first plate portion and the second plate portion intersect with each other; the first convex structure is protruded when viewed from the wall plate; the retractable mechanism is connected between the hanging rod and the display hanging member; the display hanging member is configured to fix to a predetermined position on a back of a display; and the hanging hook is inserted into the hanging hook groove for hanging the display on the wall plate.

15. The display mounting support according to claim 14, wherein: the hanging hook comprises a cantilever portion and a first concave structure; the cantilever portion is connected to one end of the connecting rod away from the hanging rod and towards the wall plate; the first concave structure comprises a third plate portion and a fourth plate portion; the third plate portion and the fourth plate portion are disposed side by side on the side of the cantilever portion facing the wall plate and extending towards the hanging rod; adjacent edges of the third plate portion and the fourth plate portion intersect with each other; the first concave structure is recessed when viewed from the wall plate; and a minimum distance between the first convex structure and the first concave structure is greater than or equal to a thickness of the first guiding bar.

16. The display mounting support according to claim 15, wherein the first concave structure is a V-shaped structure, and the first convex structure is correspondingly also a V-shaped structure.

17. The display mounting support according to claim 14, wherein: the first supporting member further comprises a protruding portion; the protruding portion comprises a fifth plate portion and a sixth plate portion; adjacent edges of the fifth plate portion and the sixth plate portion intersect with each other; the fifth plate portion is adjacent to and parallel to the first plate portion; the sixth plate portion is adjacent to and parallel to the second plate portion; when the first supporting member is received in the receiving groove; the fifth plate portion resists against inside of the first plate portion; and the sixth plate portion resists against inside of the second plate portion.

18. The display mounting support according to claim 14, wherein: the wall plate further comprises a second guiding bar; the wall frame and the second guiding bar are connected to form a locking hook groove; the locking hook groove extends in a left-right direction along the display mounting support; opening of the locking hook groove and opening of the hanging hook groove are set back to back; the at least one hanging assembly further comprises a pull cord assembly; the pull cord assembly is connected to the other end of the hanging rod; the pull cord assembly comprises a locking hook; the locking hook is inserted into the locking hook groove for locking the at least one hanging assembly on the wall plate; the pull cord assembly further comprises a second supporting member; the second supporting member is located within a locking member; the second supporting member comprises a second convex structure on a side of the second supporting member facing the locking hook; the second convex structure comprises a seventh plate portion and an eighth plate portion; adjacent edges of the seventh plate portion and the eighth plate portion intersect with each other; and the second convex structure is protruded when being viewed from the wall plate.

19. The display mounting support according to claim 18, wherein: the locking hook comprises two cantilever arms and a second concave structure; the second concave structure is connected between the two cantilever arms; the second concave structure comprises a ninth plate portion and a tenth plate portion; the ninth plate portion is adjacent to the seventh plate portion; the tenth plate portion is adjacent to the eighth plate portion; adjacent edges of the ninth plate portion and the tenth plate portion intersect with each other; and the second concave structure is recessed when being viewed from the wall plate.

20. The display mounting support according to claim 18, wherein: the second supporting member defines an inserting groove; the pull cord assembly comprises a locking member; the locking member comprise an inserting portion and the locking hook; the locking hook is connected to one side of the inserting portion; the inserting portion is inserted into the inserting groove; and the locking hook is located outside of the inserting groove and is spaced apart from the second convex structure of the second supporting member so as to form a snapping space for snapping into the locking hook groove.

* * * * *